United States Patent
Nakasone

(10) Patent No.: US 12,371,932 B2
(45) Date of Patent: Jul. 29, 2025

(54) ROTATION MEMBER CONNECTING STRUCTURE AND METHOD FOR MANUFACTURING SAID STRUCTURE

(71) Applicant: PIOLAX, INC., Kanagawa (JP)

(72) Inventor: Hisashi Nakasone, Kanagawa (JP)

(73) Assignee: PIOLAX, INC., Kanagawa (JP)

( * ) Notice: Subject to any disclaimer, the term of this patent is extended or adjusted under 35 U.S.C. 154(b) by 232 days.

(21) Appl. No.: 17/781,964

(22) PCT Filed: Dec. 3, 2020

(86) PCT No.: PCT/JP2020/044995
§ 371 (c)(1),
(2) Date: Jun. 2, 2022

(87) PCT Pub. No.: WO2021/117592
PCT Pub. Date: Jun. 17, 2021

(65) Prior Publication Data
US 2023/0010152 A1     Jan. 12, 2023

(30) Foreign Application Priority Data

Dec. 10, 2019   (JP) ................................. 2019-222724

(51) Int. Cl.
*E05C 9/04* (2006.01)
*B29C 45/14* (2006.01)
(Continued)

(52) U.S. Cl.
CPC .............. *E05C 9/043* (2013.01); *B29C 45/14* (2013.01); *B29C 45/16* (2013.01); *B60R 7/06* (2013.01);
(Continued)

(58) Field of Classification Search
CPC . E05C 9/043; E05C 9/04; E05C 21/00; E05C 19/005; E05C 19/16; E05B 83/30;
(Continued)

(56) References Cited

U.S. PATENT DOCUMENTS 7,455,333 B2 * 11/2008 Ookawara ............... E05B 83/30
292/34
8,012,393 B2 *  9/2011 Hager .................. B29C 45/1635
264/251
(Continued)

FOREIGN PATENT DOCUMENTS

CN       103850551 A  *  6/2014   ............... E05C 9/04
CN       203654944 U  *  6/2014   ............... E05C 9/08
(Continued)

OTHER PUBLICATIONS

Espacenet machine translation CN203654944U claims and description Jun. 18, 2014 (Year: 2024).*
(Continued)

*Primary Examiner* — Kristina R Fulton
*Assistant Examiner* — Steven A Tullia
(74) *Attorney, Agent, or Firm* — Paratus Law Group, PLLC

(57) ABSTRACT

There is provided a connecting structure of a rotating member. One of the rotating support member and the rotating member includes a support shaft. The other of the rotating support member and the rotating member includes a holding portion. The support shaft includes a regulating portion, and a sliding contact portion that is configured to be in sliding contact with an inner periphery of the holding portion. The rotating support member and the rotating member are made of materials that do not join each other when molded from the resin materials. The inner periphery of the holding portion has a shape in which a portion in close
(Continued)

contact with the sliding contact portion is continuously formed in a circumferential direction, so that the rotating support member and the rotating member are molded in a state of being connected to each other.

8 Claims, 19 Drawing Sheets

(51) Int. Cl.
| | | |
|---|---|---|
| *B29C 45/16* | (2006.01) | |
| *B60R 7/06* | (2006.01) | |
| *E05B 83/30* | (2014.01) | |
| *E05C 21/00* | (2006.01) | |
| *F16C 11/06* | (2006.01) | |

(52) U.S. Cl.
CPC .............. *E05B 83/30* (2013.01); *E05C 21/00* (2013.01); *F16C 11/06* (2013.01)

(58) Field of Classification Search
CPC .......... E05B 83/28; E05B 79/12; E05B 79/16; E05B 79/00; B29C 45/14; B29C 45/16; B29C 45/0017; B29C 45/14336; B29C 45/1615; B60R 7/06; F16C 11/06; F16C 2208/20; F16C 2220/04; F16C 2326/01; F16C 11/0685; Y10T 292/0839
See application file for complete search history.

(56) References Cited

U.S. PATENT DOCUMENTS

| | | | | |
|---|---|---|---|---|
| 8,590,351 B2 * | 11/2013 | Ookawara | ............... | E05C 9/047 |
| | | | | 292/37 |
| 9,074,389 B2 * | 7/2015 | Shimizu | ............... | E05D 1/04 |
| 9,121,206 B2 * | 9/2015 | Shimizu | ............... | E05C 9/042 |
| 9,850,691 B2 * | 12/2017 | Nakasone | ............... | E05C 9/041 |
| 10,435,921 B2 * | 10/2019 | Nakasone | ............... | E05C 9/043 |
| 10,738,511 B2 * | 8/2020 | Nakasone | ............... | E05C 9/04 |
| 11,821,244 B2 * | 11/2023 | Nakasone | ............... | E05B 83/30 |
| 2005/0248055 A1 * | 11/2005 | Youngs | ............... | B60R 13/0243 |
| | | | | 264/250 |
| 2007/0080542 A1 | 4/2007 | Ookawara | | |
| 2015/0008680 A1 * | 1/2015 | Suzuki | ............... | E05B 63/20 |
| | | | | 292/32 |
| 2016/0097225 A1 * | 4/2016 | Tamaki | ............... | E05B 83/30 |
| | | | | 292/137 |
| 2021/0140204 A1 * | 5/2021 | Minnich | ............... | E05B 13/10 |
| 2022/0341224 A1 * | 10/2022 | Minnich | ............... | E05B 83/30 |
| 2023/0010152 A1 * | 1/2023 | Nakasone | ............... | E05B 83/30 |

FOREIGN PATENT DOCUMENTS

| | | | | | |
|---|---|---|---|---|---|
| CN | 204024260 U | * | 12/2014 | ............. | E05B 83/30 |
| CN | 107965217 A | * | 4/2018 | ............. | E05C 9/04 |
| CN | 108291412 A | * | 7/2018 | ............. | B60R 7/06 |
| CN | 108868393 A | * | 11/2018 | ............. | E05B 83/30 |
| CN | 109236070 A | * | 1/2019 | ............. | E05B 83/30 |
| DE | 102008000181 A1 | * | 8/2009 | ............. | B60J 5/0416 |
| DE | 102017100935 A1 | * | 7/2018 | ............. | E05B 83/32 |
| EP | 3800311 A1 | * | 4/2021 | ............. | B60R 7/04 |
| GB | 2363423 A | * | 12/2001 | ............. | E05B 77/36 |
| JP | S48-059969 U | | 7/1973 | | |
| JP | S56-099113 U | | 8/1981 | | |
| JP | H0251717 U | * | 4/1990 | ............. | F16C 33/44 |
| JP | H03-102637 U | | 10/1991 | | |
| JP | 2007-100343 A | | 4/2007 | | |
| JP | 5785271 B2 | * | 9/2015 | ............. | E05B 83/30 |
| KR | 100469051 B1 | * | 3/2002 | ............. | E05B 83/30 |
| KR | 100589272 B1 | * | 8/2004 | ............. | E05B 83/30 |
| KR | 100880909 B1 | * | 11/2007 | ............. | E05B 83/30 |
| KR | 20110101617 A | * | 3/2010 | ............. | B65D 45/22 |
| KR | 20160143513 A | * | 5/2016 | ............. | E05B 17/22 |
| KR | 20180049406 A | * | 11/2016 | ............. | E05B 79/14 |
| KR | 2016143513 A | * | 12/2016 | ............. | E05B 15/04 |
| KR | 20210051154 A | * | 10/2019 | ............. | E05C 9/04 |
| WO | WO-2005021231 A2 | * | 3/2005 | ......... | B29C 45/1639 |
| WO | WO-2012132546 A1 | * | 10/2012 | ............. | E05B 63/14 |
| WO | WO-2013018496 A1 | * | 2/2013 | ............. | E05B 13/10 |
| WO | WO-2013187388 A1 | * | 12/2013 | ........... | E05B 1/0038 |
| WO | WO-2015019571 A1 | * | 2/2015 | ............. | B60R 7/06 |
| WO | WO-2015125687 A1 | * | 8/2015 | ............. | B60R 7/06 |
| WO | WO-2015125774 A1 | * | 8/2015 | ............. | E05B 83/30 |
| WO | WO-2018008598 A1 | * | 1/2018 | ............. | B60R 7/06 |

OTHER PUBLICATIONS

Espacenet machine translation DE102008000181A1 claims and description Aug. 6, 2009 (Year: 2024).*
CN203654944U Espacenet machine translation claims and description (Year: 2024).*
Oct. 20, 2021, International Preliminary Report on Patentability issued for related PCT application No. PCT/JP2020/044995.
Feb. 9, 2021, International Search Report issued for related PCT application No. PCT/JP2020/044995.
Feb. 9, 2021, International Search Opinion issued for related PCT application No. PCT/JP2020/044995.
Oct. 20, 2021, PCT/IPEA/409 issued for related PCT application No. PCT/JP2020/044995.

* cited by examiner

ROTATION MEMBER CONNECTING STRUCTURE AND METHOD FOR MANUFACTURING SAID STRUCTURE

CROSS REFERENCE TO PRIOR APPLICATION

This application is a National Stage Patent Application of PCT International Patent Application No. PCT/JP2020/044995 (filed on Dec. 3, 2020) under 35 U.S.C. § 371, which claims priority to Japanese Patent Application No. 2019-222724 (filed on Dec. 10, 2019), which are all hereby incorporated by reference in their entirety.

TECHNICAL FIELD

The present invention relates to a connecting structure of a rotating member for rotatably connecting a rotating member to a rotating support member, and a method for manufacturing the same connecting structure of a rotating member.

BACKGROUND ART

For example, an opening and closing body such as a lid is openably and closably attached to an opening portion formed in a fixed body such as a glove box of an automobile. A locking device is provided between the opening portion and the opening and closing body so as to lock the opening and closing body when the opening and closing body is closed and to release the lock when the opening and closing body is opened. The locking device includes, for example, a rotor rotatably supported by the opening and closing body and a rod connected to the rotor. The locking device may have a configuration in which a rod tip portion engages with and disengages from a lock hole formed in the fixed body so that the opening and closing body can be opened and closed with respect to the opening portion.

For example, Patent Literature 1 describes a side lock device including a retainer fixed to a back side of a lid, a rotor rotatably and pivotally supported by the retainer, and a pair of rods, each of which includes a proximal end portion connected to the rotor. The rotor is provided with a pair of spherically bulging engaging portions. Meanwhile, the proximal end portion of the rod has a concave shape with an open upper portion. By inserting the spherical engaging portions of the rotor into the concave proximal end portions of the rod, the engaging portions engage with the proximal end portions of the rod so that the proximal end portions of the rod are connected to the rotor.

CITATION LIST

Patent Literature

Patent Literature 1: JP-A-2007-100343

SUMMARY OF INVENTION

Technical Problem

In the side lock device of Patent Literature 1, as described above, when connecting the proximal end portions of the rod to the rotor, it is necessary to insert the spherical engaging portions of the rotor into the concave proximal end portions of the rod, which requires man-hours. It is difficult to adapt an inner peripheral shape of the proximal end portions of the rod to the spherical shape of the rotor, and raffling may occur at the proximal end portions of the rod connected to the rotor.

Therefore, an object of the present invention is to provide a connecting structure of a rotating member that can eliminate an operation of connecting a rotating support member and a rotating member and that can suppress the rotating member from rattling with respect to the rotating member support member, and a method for manufacturing the connecting structure of a rotating member.

Solution to Problem

In order to achieve the above object, a connecting structure of a rotating member according to the present invention is a structure in which the rotating member molded from a resin material is configured to be rotatably connected to a rotating support member molded from a resin material. One of the rotating support member and the rotating member includes a support shaft. The other of the rotating support member and the rotating member includes a holding portion that is configured to receive and hold the support shaft. The support shaft includes a regulating portion that is configured to regulate axial movement of the support shaft with respect to the holding portion, and a sliding contact portion that has a circular shape when viewed from an axial direction of the support shaft and that is configured to be in sliding contact with an inner periphery of the holding portion. The rotating support member and the rotating member are made of materials that do not join each other when molded from the resin materials. The inner periphery of the holding portion has a shape in which a portion in close contact with the sliding contact portion is continuously formed in a circumferential direction, so that the rotating support member and the rotating member are molded in a state of being connected to each other.

A method for manufacturing the connecting structure of the rotating member according to the present invention includes a first step of molding one of the rotating support member and the rotating member including the support shaft by injecting a first resin material into a first injection molding mold; and a second step of injecting a second resin material that does not join with the first resin material in a molten state into a second injection molding mold to mold the other of the rotating support member and the rotating member including the holding portion, with a molded product molded in the first step arranged in the second injection molding mold.

Advantageous Effects of Invention

According to the present invention, the inner periphery of the holding portion has a shape in which a portion in close contact with the regulating portion and the sliding contact portion is continuously formed in the circumferential direction so that the rotating support member and the rotating member are formed in a connected state, and therefore, the support shaft can be rotatable supported by the holding portion in a state where both members are molded, and an operation of connecting the rotating member and the rotating support member can be eliminated. Since the inner periphery of the holding portion is in close contact with the sliding contact portion of the support shaft, it is possible to suppress rattling when the rotating member rotates with respect to the rotating support member.

BRIEF DESCRIPTION OF DRAWINGS

FIGS. 8A to 8E show modified examples of a support shaft and a holding portion, in which FIG. 8A is an enlarged explanatory diagram of Modified Example 1, FIG. 8B is an enlarged explanatory diagram of Modified Example 2, FIG. 8C is an enlarged explanatory diagram of Modified Example 3, FIG. 8D is an enlarged explanatory diagram of Modified Example 4, and FIG. 8E is an enlarged explanatory diagram of Modified Example 5.

FIGS. 9A and 9B show a method for manufacturing the connecting structure of a rotating member according to the present invention, in which FIG. 9A is an explanatory diagram of a first step, and FIG. 9B is an explanatory diagram of a second step.

FIGS. 14A and 14B show a second embodiment of the connecting structure of a rotating member according to the present invention, in which FIG. 14A is an enlarged plan view of a main part thereof, and FIG. 14B is an enlarged side view of the main part thereof.

FIGS. 17A and 17B show a third embodiment of the connecting structure of a rotating member according to the present invention, in which FIG. 17A is an enlarged perspective diagram of a main part thereof, and FIG. 17B is a cross-sectional diagram taken along an arrow line C-C in FIG. 17A.

FIGS. 18A and 18B show a fourth embodiment of the connecting structure of a rotating member according to the present invention, in which FIG. 18A is an enlarged perspective diagram of a main part thereof, and FIG. 18B is a cross-sectional diagram taken along an arrow line D-D in FIG. 18A.

FIGS. 19A and 19B show a fifth embodiment of the connecting structure of a rotating member according to the present invention, in which FIG. 19A is an enlarged perspective diagram of a main part thereof, and FIG. 19B is a cross-sectional diagram taken along an arrow line H-H in FIG. 19A.

DESCRIPTION OF EMBODIMENTS

Hereinafter, a first embodiment of a connecting structure of a rotating member according to the present invention will be described with reference to FIGS. 1 to 13.

Figure 1:
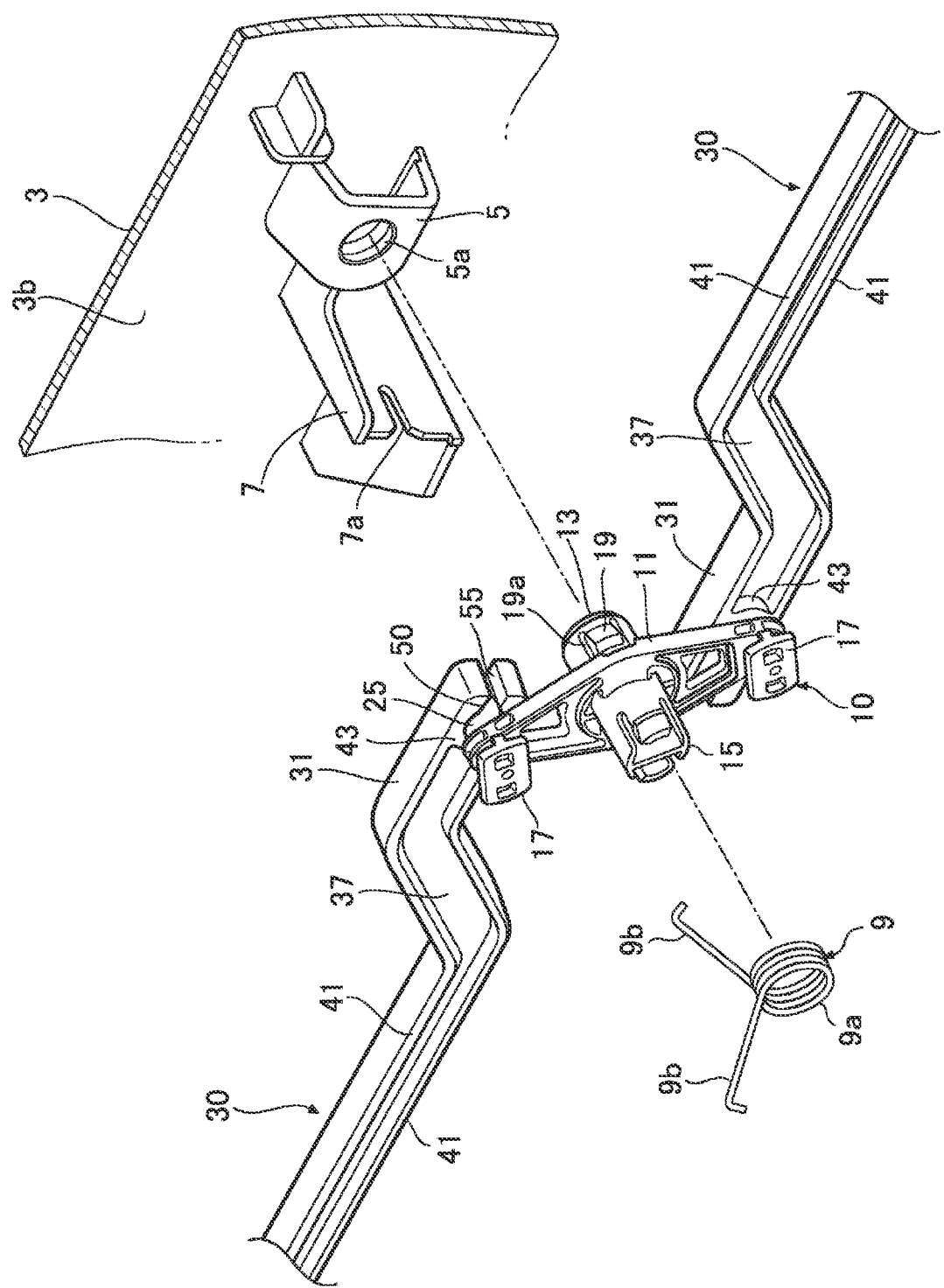
FIG. 1 is a perspective diagram showing a first embodiment of a connecting structure of a rotating member according to the present invention.

As shown in FIG. 1 the connecting structure of a rotating member (hereinafter, also simply referred to as "connecting structure") is used for rotatably connecting a rotating member 30 made of a resin material to a rotating support member 10 made of a resin material. The rotating support member 10 and the rotating member 30 are made of materials that do not join each other when they are molded from a resin material.

Figure 10:
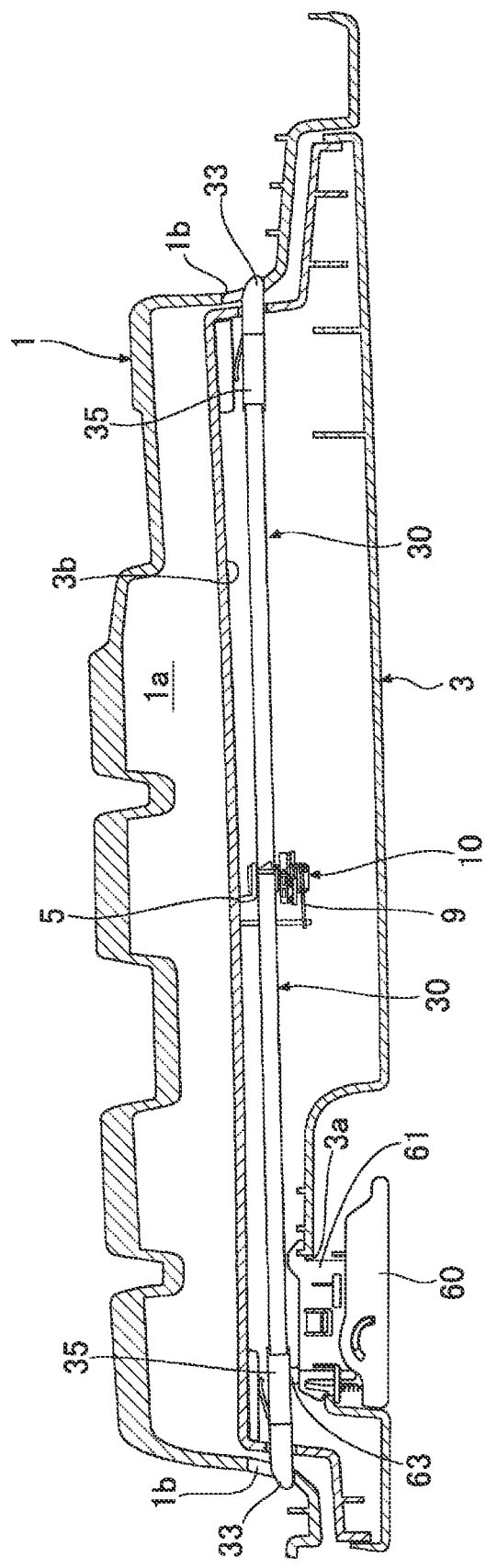
FIG. 10 is a plan explanatory diagram showing a case where an opening and closing body is locked in a closed state when the connecting structure is applied to a locking device.

The connecting structure can be applied to, for example, a locking device of an opening and closing body (hereinafter, also simply referred to as "locking device") as shown in FIG. 10. The connecting structure can be applied not only to the locking device but also to, for example, a damper device (which will be described in the following embodiments).

Figure 12:
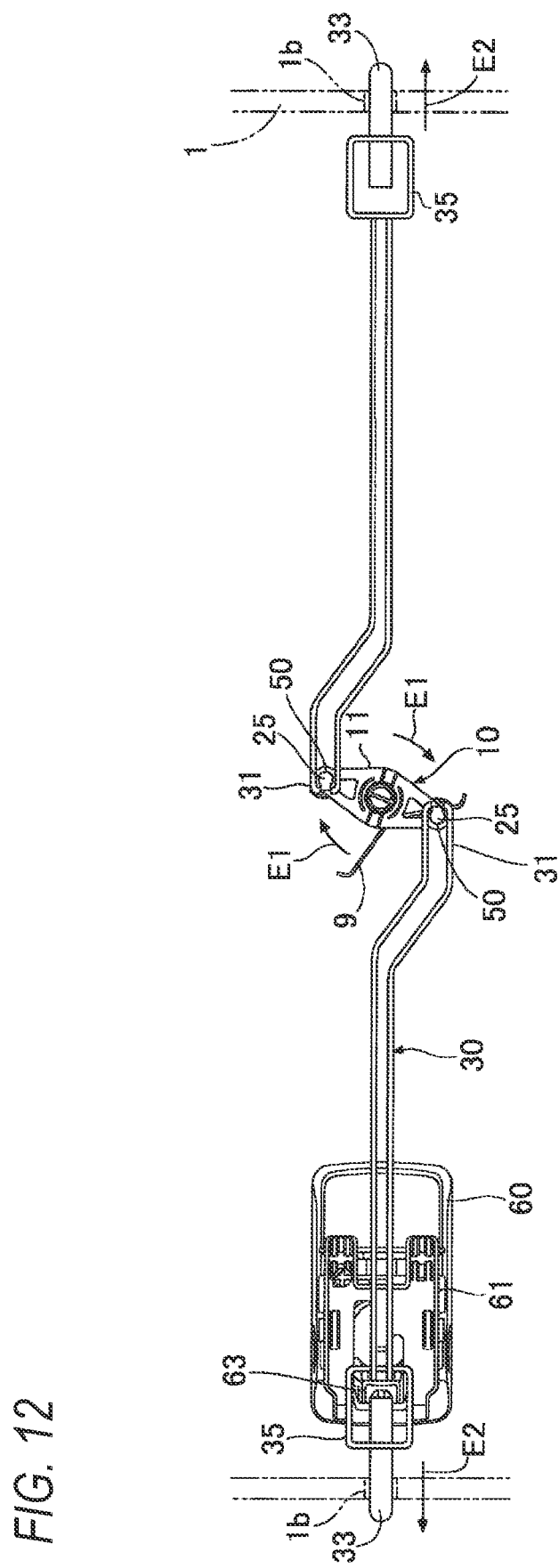
FIG. 12 is a front explanatory diagram showing the case where the opening and closing body is locked in the closed state when the connecting structure is applied to the locking device.

The locking device is used for, for example, opening and closing and locking an opening and closing body 3 such as a glove box, which is operably and closably attached to an opening portion 1a of a fixed body 1 such as an instrument panel of a vehicle. As shown in FIGS. 10 and 12, a pair of hole-shaped lock portions 1b, 1b are formed on both sides in a width direction of the opening portion 1a of the fixed body 1, respectively.

In the connecting structure of the embodiment, the rotating support member 10 forms a rotor in the locking device, and the rotating member 30 forms a rod in the locking device. In the embodiment, a pair of rotating members 30, 30 are provided.

Figure 11:
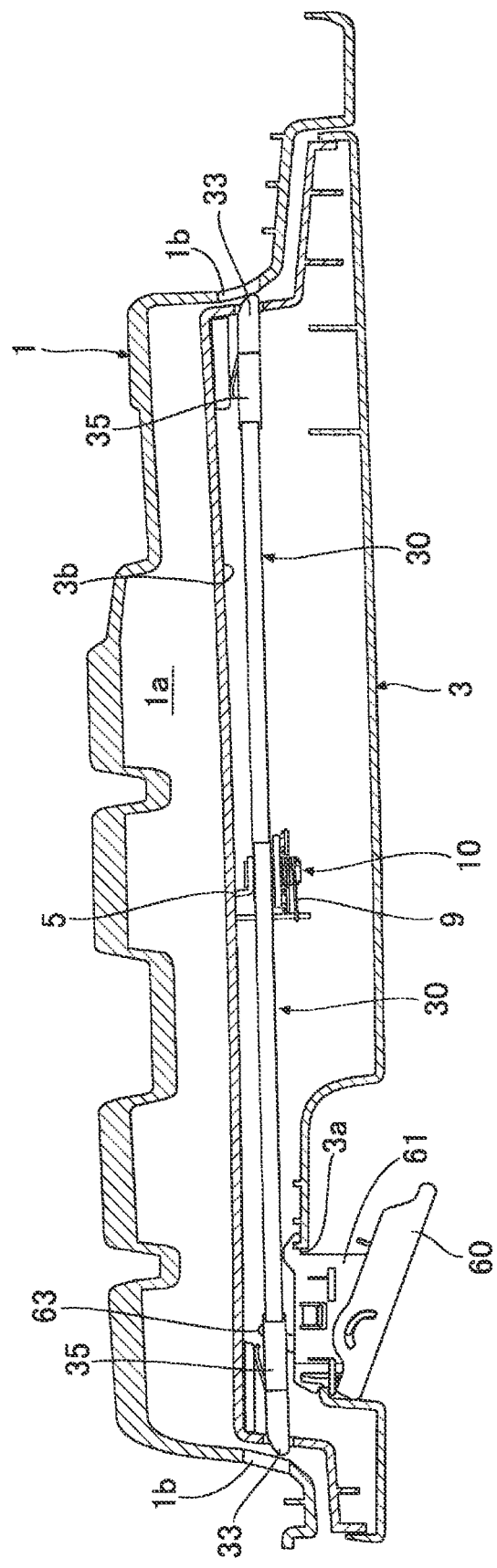
FIG. 11 is a plan explanatory diagram showing a case where the opening and closing body is released from a locking state when the connecting structure is applied to the locking device.

As shown in FIGS. 10 and 11, the pair of rotating members 30, 30 forming the rod are arranged so as to be slidable with respect to the opening and closing body 3, and are operated via the operating member 60 so as to engage with and disengage from the lock portions 1b, 1b. The rotating support member 10 forming the rotor connects the pair of rotating members 30, 30 to each other in order to interlock a sliding operation of the pair of rotating members 30, 30 forming the rod.

The locking device further includes an urging spring 9 that urges the pair of rotating members 30, 30 forming the rod in a direction of engaging with the lock portions 1b, 1b (see FIG. 1). The urging spring 9 is a torsion spring, and includes a winding portion 9a and a pair of arm portions 9b, 9b extending from the winding portion 9a.

The operating member 60 slides the pair of rotating members 30, 30 forming the rod in a direction of disengaging from the lock portions 1b, 1b. As shown in FIGS. 10 to 13, the operating member 60 includes a lever 63 projecting from a back side thereof, and is configured to be close to and separated from a base member 61 attached to a mounting hole 3a of the opening and closing body 3.

As shown in FIGS. 1 and 10, a support portion 5 for rotatably supporting the rotating support member 10 is projected from an inner surface 3b of the opening and closing body 3. Referring to FIG. 1, the support portion 5 has a box shape like a dog house with an open front side, and includes a ceiling surface formed with a circular hole-shaped support hole 5a. A spring locking wall 7 is erected at a position adjacent to the support portion 5. The spring locking wall 7 is formed with a locking groove 7a and one arm portion 9b of the urging spring 9 is locked in the locking groove 7a.

Figure 4:
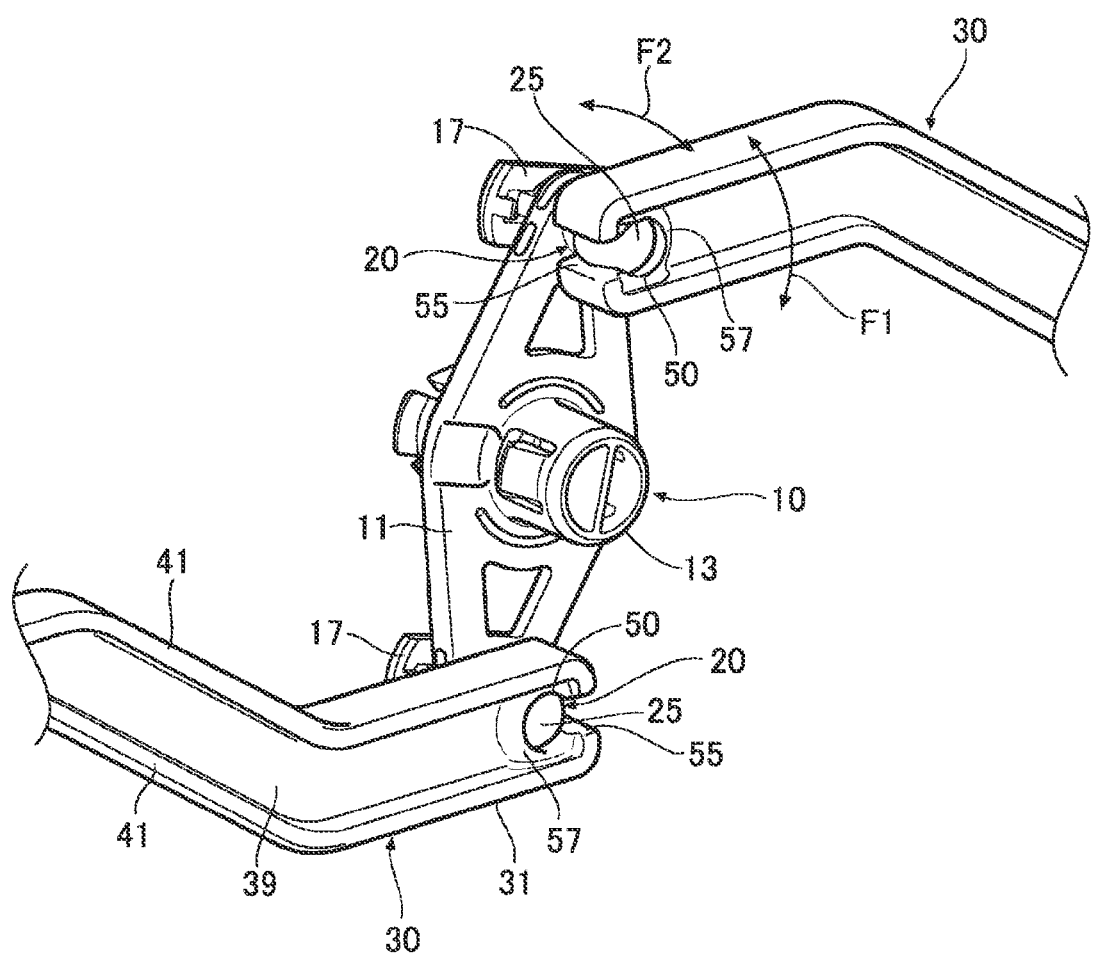
FIG. 4 is an enlarged perspective diagram of a main part of the connection structure.

In the connecting structure, the rotating support member 10 includes a support shaft 20, and the rotating member 30 includes a holding portion 50 that receives and holds the support shaft 20 (see FIG. 4).

As shown in FIGS. 1 and 4, the rotating support member 10 includes a main body 11 having a substantially rhombus shape, a substantially cylindrical shaft portion 13 projecting from a center of a back side of the main body 11, a substantially cylindrical spring mounting portion 15 projecting from a center of a front side of the main body 11, and spring locking pieces 17, 17 projecting from the front side and both ends in a longitudinal direction of the main body 11. An outer periphery of the shaft portion 13 is formed with bendable engagement pieces 19, 19 via a U-shaped slit 19a.

The above-mentioned "front side" means a surface located in a direction in which the opening and closing body opens from the opening portion of the fixed body such as a vehicle. The same applies to a "front surface side". In the case of the rotating support member, it can be said that a front side thereof is opposite to a surface facing the rotating member. The "back side" or "back surface side" means a surface opposite to the "front side" or "front surface side", that is, a surface located in a direction in which the opening and closing body closes. In the case of the rotating support member, it can be said that a back side thereof is on a side facing the rotating member. The "front side", "front surface side", "back side", and "back surface side" have the same meaning in other members (the rotating member 30 and the like) described below.

The support shaft 20 is projected from the back side and both ends in the longitudinal direction of the main body 11. As shown in FIGS. 5A to 7, the support shaft 20 includes a regulating portion 25 that regulates axial movement of the support shaft 20 with respect to the holding portion 50 (suppresses the support shaft 20 from coming off from the holding portion 50), and a sliding contact portion 27 that has a circular shape when viewed from an axial direction of the support shaft 20 and that is in sliding contact with an inner periphery 51 of the holding portion 50.

Figure 6A:
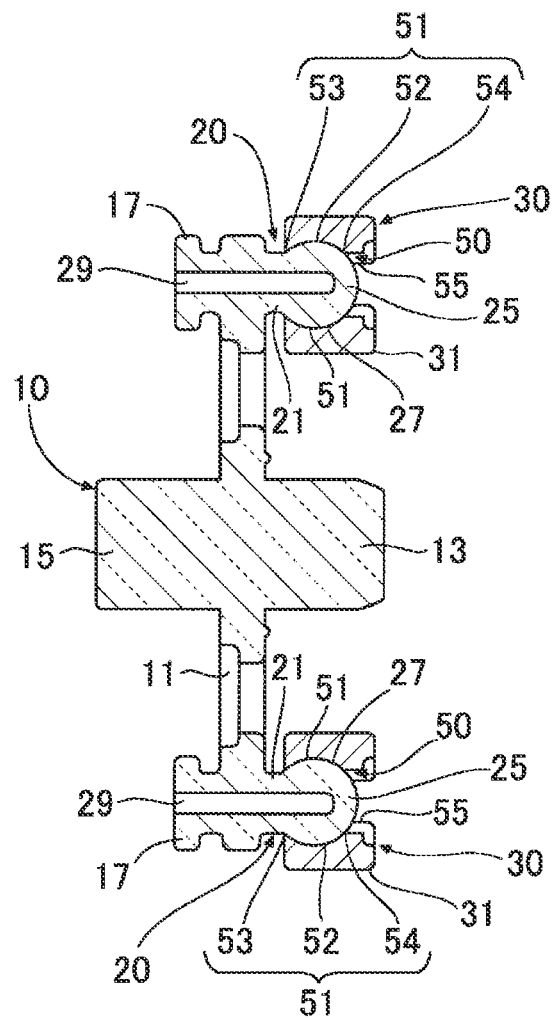
FIG. 6A is a cross-sectional diagram taken along an arrow line A1-A1 in FIG. 5A.
Figure 6B:
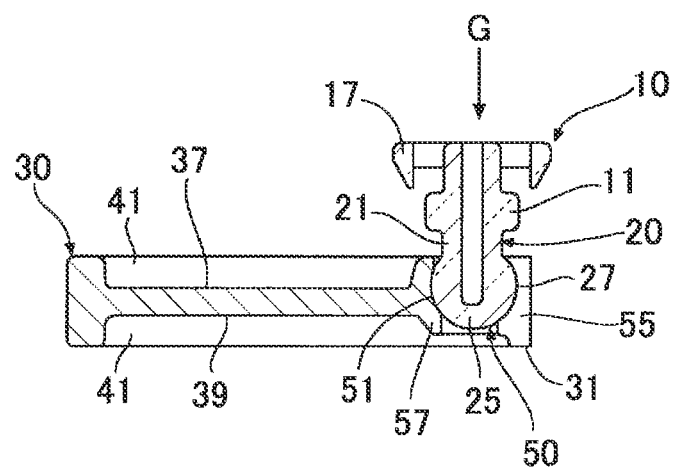
FIG. 6B is a cross-sectional diagram taken along an arrow line A2-A2 in FIG. 5A.

More specifically, each support shaft 20 in the embodiment projects from the back side of the main body 11, and includes a base portion 21 having a circular outer periphery, and the spherically bulging regulating portion 25 (having a circular cross section), which is continuously provided at a tip of the base portion 21 in a protruding direction. The support shaft 20 is provided at a position matching with the spring locking piece 17, and is provided coaxially with the spring locking piece 17. The regulating portion 25 has a circular shape when viewed from the axial direction of the support shaft 20, and the outer periphery of the regulating portion 25 is the sliding contact portion 27 that is in sliding contact with the inner periphery 51 of the holding portion 50. An outer diameter of the regulating portion 25 is formed to be larger than an outer diameter of the base portion 21. As shown in FIGS. 6A and 6B, from a front side of the spring locking piece 17, a punching hole 29 is formed up to a range that passes through the main body 11 and that reaches the middle of the regulating portion 25 of the support shaft 20.

Figure 8A:
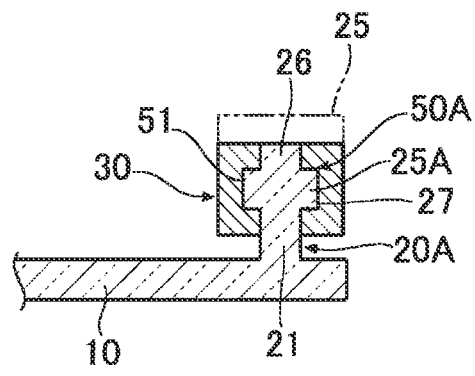

The shapes of the regulating portion and the sliding contact portion constituting the rotating support shaft are not limited to the above aspects. For example, the regulating portion may have a cross section in a substantially elliptical shape, an oval shape, a rectangular shape, or the like, and the outer periphery thereof may be a sliding contact portion. In the embodiment, the outer periphery of the regulating portion forms the sliding contact portion, but the regulating portion and the sliding contact portion may be provided separately. For example, as shown in FIG. 8A, the support shaft is shaped like a shaft having a constant diameter, and the regulating portion 25 (see a two-dot chain line in FIG. 8A) is provided at an upper end of the support shaft and is arranged on a front side of the holding portion 50 to suppress the support shaft 20 from coming off from the holding portion 50 and to hold the support shaft, and the outer periphery of the support shaft on a base end side with respect to the regulating portion 25 may be made as the sliding contact portion. Other shapes of the regulating portion and the sliding contact portion will be described later with reference to FIGS. 8A to 8E together with the holding portion.

Next, the rotating member 30 will be described more specifically.

Figure 3:
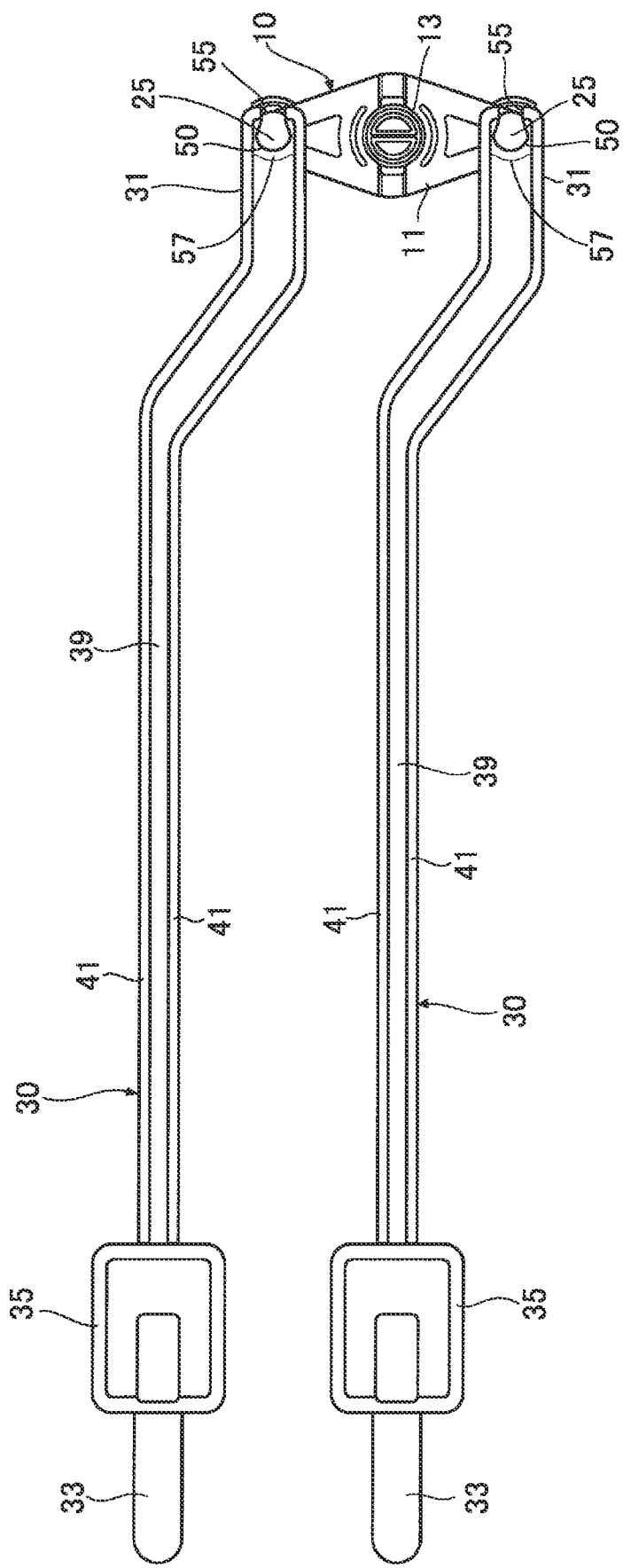
FIG. 3 is a plan view of the connecting structure.

As shown in FIG. 3, the rotating member 30 bends like a crank on a proximal end portion 31 side and extends linearly toward a tip end side thereof. A tip portion 33 of the rotating member 30 has a pin shape with an inclined surface at a tip thereof, and the tip portion 33 engages with and disengages from the lock portion 1b (see FIGS. 10 to 13). The locking device in the embodiment includes the pair of rotating members 30, 30 but both have the same shape. The tip end side of the rotating member 30 is provided with a frame-shaped portion 35 having a square frame shape and into which the lever 63 of the operating member 60 is inserted. The holding portion 50 is provided at the proximal end portion 31 of the rotating member 30.

Figure 2:
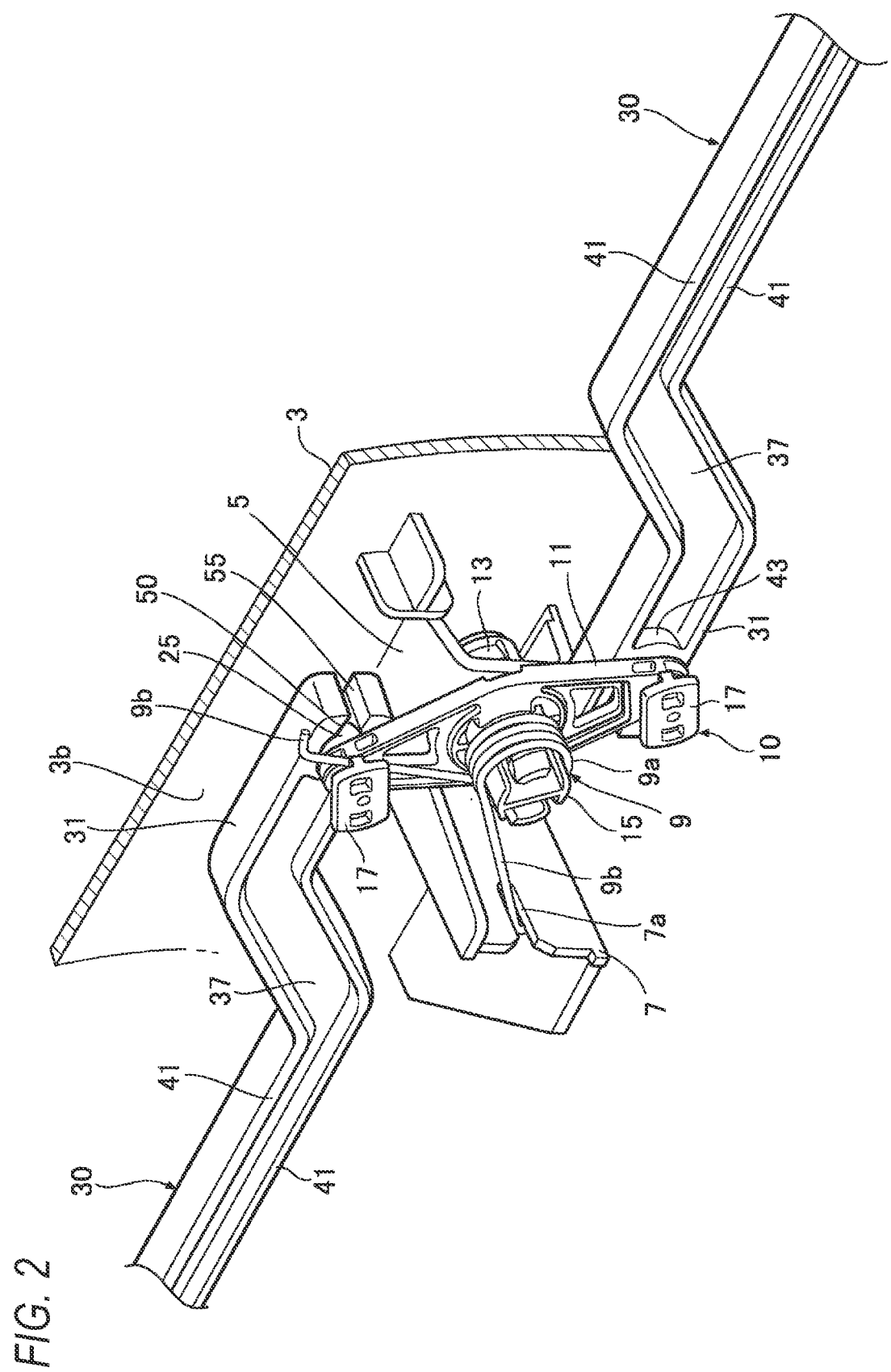
FIG. 2 is a perspective diagram showing a state where the connecting structure is attached to a predetermined member.

As shown in FIGS. 1 and 4, extension ribs 41, 41 extending along an extension shape of the rotating member 30 are provided on a front surface 37 (an opposite surface to the rotating support member 10) and a back surface 39 (a surface opposite to the opposite surface to the rotating support member 10) of the rotating member 30, which are side edge portions in the width direction. As shown in FIG. 2, an arcuate rib 43 for connecting the extension ribs 41, 41 to each other is provided on the front surface 37 side of the rotating member 30, which is an outer peripheral edge portion of the holding portion 50.

In this connecting structure, as shown in FIGS. 6A and 6B, FIG. 7, and FIG. 9B, the inner periphery 51 of the holding portion 50 has a shape in which a portion in close contact with the sliding contact portion 27 is continuously formed in a circumferential direction, so that the rotating support member 10 and the rotating member 30 are formed so as to be connected to each other. It can also be said that the inner periphery 51 of the holding portion 50 has a shape of being in close contact with and surrounding the sliding contact portion 27 of the support shaft 20 in a state where the rotating support member 10 and the rotating member 30 are molded from the resin materials. That is, instead of connecting the proximal end portion of the rod to the rotor by inserting the spherical engaging portion of the rotor into the concave proximal end portion of the rod as the side lock device of Patent Literature 1 in the related art, the connecting structure adopts a configuration in which, with the rotating support member 10 and the rotating member 30 molded from the resin materials, the sliding contact portion 27 of the support shaft 20 includes a portion with which the inner periphery 51 of the holding portion 50 is in close contact, and the portion has a shape that is continuous in the circumferential direction and surrounds the sliding contact portion 27, so that the rotating support member 10 and the rotating member 30 are in a state of being connected in advance.

As shown in FIGS. 6A and 6B, the inner periphery 51 of the holding portion 50 in the embodiment has a shape in which a portion in close contact with the regulating portion 25 and the sliding contact portion 27 is continuously formed in the circumferential direction so that the rotating support member 10 and the rotating member 30 are molded so as to be connected to each other (In Modified Examples 1 to 5 of the support shaft and the holding portion shown in FIGS. 8A to 8E described later, the inner periphery of the holding portion is formed in close contact with the regulating portion and the sliding contact portion and continuously in the circumferential direction). When the regulating portion 25 is arranged on the front side of the holding portion 50, which is indicated by a two-dot chain line in FIG. 8A, the front side peripheral edge portion of the holding portion 50 is formed in close contact with the back side peripheral edge portion of the regulating portion 25 and continuously in the circumferential direction.

As shown in FIGS. 4 to 7, the holding portion 50 has a configuration in which the front surface 37 side and the back surface 39 side of the rotating member 30 are open and lateral sides thereof communicate with the slit 55. As shown in FIGS. 6A and 6B, the inner periphery 51 of the holding portion 50 has a curved surface shape recessed so as to form a spherical shape so as to fit to the sliding contact portion 27 provided on the outer periphery of the spherical regulating portion 25 of the support shaft 20, and has a shape continuous in the circumferential direction (here, the shape is continuous in the entire circumferential direction except for the slit 55 described later). More specifically, the inner periphery 51 of the holding portion 50 has a shape in which a central portion 52 thereof has the largest diameter and which gradually narrows toward a front side peripheral edge portion 53 and a back side peripheral edge portion 54 while drawing a curved surface (see FIGS. 5A and 5B).

The holding portion 50 in the embodiment receives and holds the regulating portion 25 of the support shaft 20 at the inner periphery 51, and suppresses the support shaft 20 from coming off from the holding portion 50. That is, the minimum inner diameter of the inner periphery 51 of the holding portion 50 (inner diameter of the front side peripheral edge portion 53 and the back side peripheral edge portion 54) is formed to be smaller than the maximum outer diameter of the regulating portion 25 of the support shaft 20 (which can be said to be the outer diameter of the sliding contact portion 27). Therefore, even if the support shaft 20 is about to come off from the holding portion 50, the front side peripheral edge portion 53 and the back side peripheral edge portion 54 of the inner periphery 51 of the holding portion 50 surround and hold down the sliding contact portion 27 of the support shaft 20, so that the support shaft 20 is suppressed from coming off from the holding portion 50, and the axial movement of the support shaft 20 with respect to the holding portion 50 is restricted.

Figure 7:
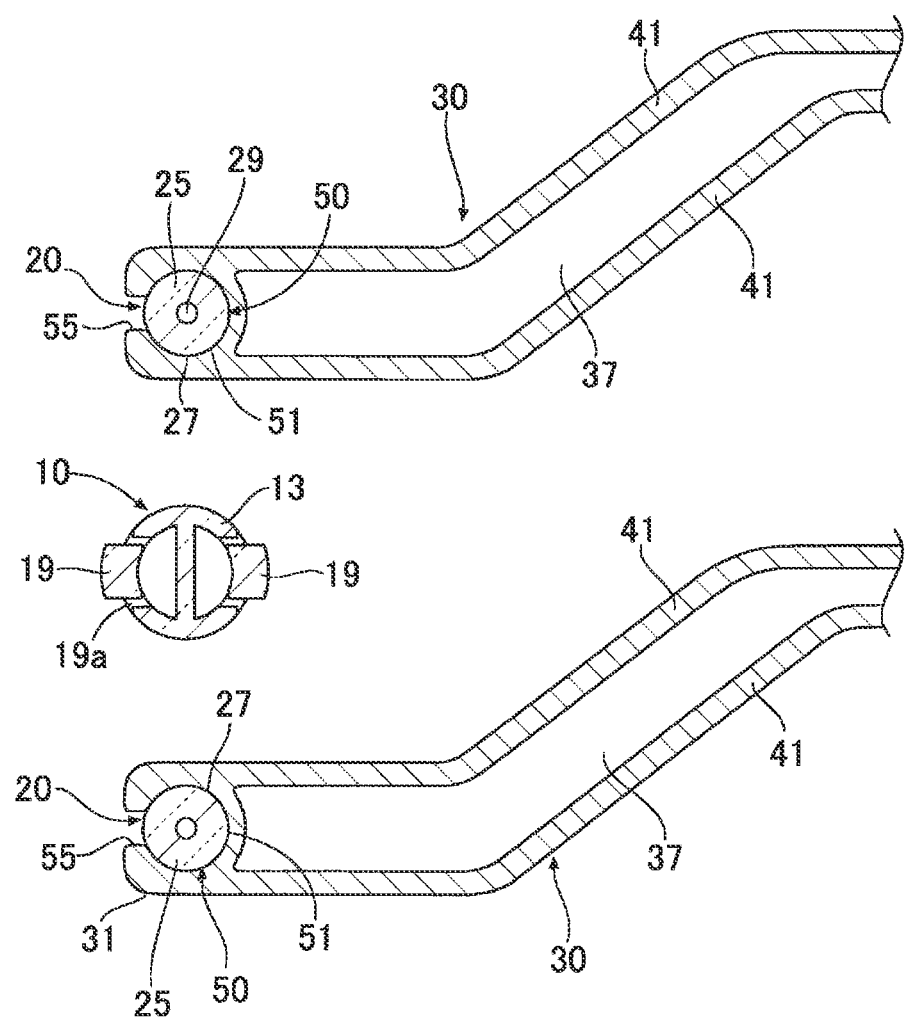
FIG. 7 is a cross-sectional diagram taken along an arrow line A3-A3 in FIG. 5B.

As shown in FIG. 7, the inner periphery 51 of the holding portion 50 is separated via the slit 55 formed in a central portion in the width direction of the proximal end portion 31 of the rotating member 30. An opening width of the slit 55 is also formed to be smaller than an outer diameter of the regulating portion 25 of the support shaft 20. As shown in FIG. 4, the slit 55 extends from the back side to the front side of the rotating member 30 with a constant width. Since the opening width of the slit 55 is formed to be smaller than the outer diameter of the regulating portion 25 of the support shaft 20, the support shaft 20 will not come out from the slit 55.

As shown in FIG. 7, the inner periphery Si of the holding portion 50 in the embodiment has a slit 55 formed in a part thereof when viewed from the axial direction of the support shaft 20, but the inner periphery 51 is in close contact with the sliding contact portion 27 over the entire region except the slit 55. That is, the entire inner periphery 51 of the holding portion 50 is continuously formed in the circumferential direction so as to be in close contact with the sliding contact portion 27, and the inner periphery 51 of the holding portion 50 is in surface contact with the sliding contact portion 27.

In this way, the inner periphery 51 of the holding portion 50 is formed continuously in the circumferential direction so as to be in close contact with the sliding contact portion 27 of the support shaft 20, so that the support shaft 20 becomes slidable on the inner periphery 51 of the holding portion 50, and the support shaft 20 is rotatably supported by the holding portion 50. In the embodiment, since the regulating portion 25 of the support shaft 20 has a spherical shape, the outer periphery thereof forms the sliding contact portion 27, and the inner periphery 51 of the holding portion 50 has a spherical concave curved surface suitable for the sliding contact portion, the rotating member 30 can rotate by 360° around an axis of the support shaft 20 as shown by an arrow F1 in FIG. 4, and can rotate in a direction in which the rotating member 30 is close to and separated from the rotating support member 10 as shown by an arrow F2 in FIG. 4, so that flexible rotation performance is ensured.

In the connecting structure, the inner periphery 51 of the holding portion 50 is continuously formed in the circumferential direction so as to be in close contact with the sliding contact portion 27 of the support shaft 20, but even in this case, the rotating member 30 is not suppressed from rotating with respect to the rotating support member 10. That is, since the rotating support member 10 and the rotating member 30 are made of materials that do not join each other during molding with resin materials, even when the rotating support member 10 and the rotating member 30 are molded from the resin materials, the inner periphery 51 of the holding portion 50 does not stick to the sliding contact portion 27 of the support shaft 20, and free rotational movement of the rotating member 30 with respect to the rotating support member 10 is maintained.

Figure 5A:
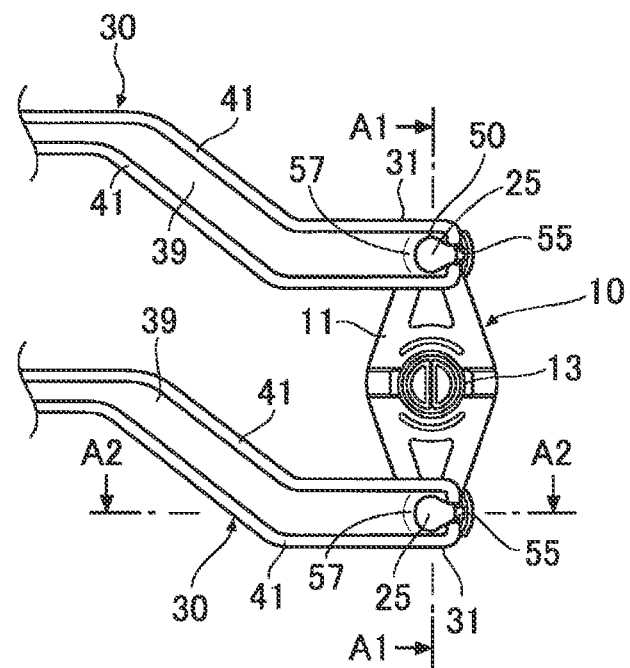
FIG. 5A is an enlarged plan view of the main part of the connecting structure.
Figure 5B:
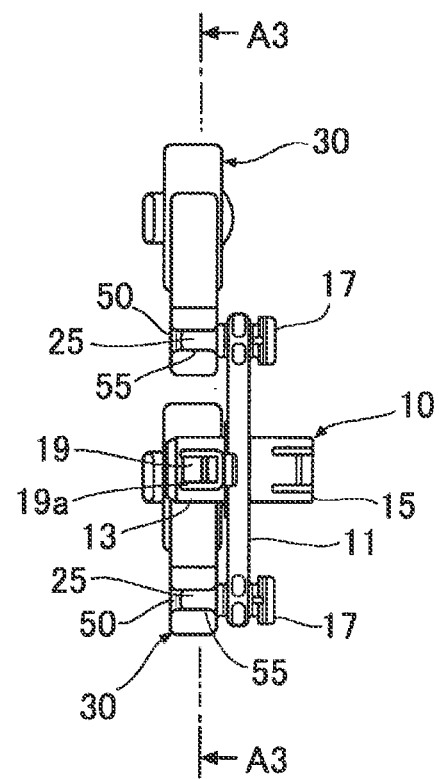
FIG. 5B is an enlarged side view of the main part of the connecting structure.

As shown in FIGS. 4 and 6B, a pressing wall portion 57 is provided on the back surface 39 side of the holding portion 50, which is an outer peripheral edge portion of the holding portion 50 on a side opposite to the slit 55. The pressing wall portion 57 has a substantially arc shape when viewed from the axial direction of the support shaft 20, and both lateral sides thereof in the width direction are connected to the extension ribs 41, 41 as shown in FIG. 5A, and has a mountain shape that gradually bulges while drawing a curved surface from the back surface 39 of the rotating member 30 toward the outer peripheral edge portion of the holding portion 50 as shown in FIG. 4. As shown in FIG. 6B, when a load is applied to the rotating member 30 in a direction indicated by an arrow G, the pressing wall portion 57 receives the load and maintains the inner periphery 51 of the holding portion 50 in close contact with the sliding contact portion 27 of the support shaft 20 to suppress rattling of the support shaft 20.

The shape and structure of the support shaft and the holding portion are not limited to the above aspects as long as the inner periphery of the holding portion has a shape in which a portion in close contact with the sliding contact portion 27 thereof is continuously formed in the circumferential direction so that the rotating support member 10 and the rotating member 30 are molded in a connected state, and may be modified examples as shown in FIGS. 8A to 8E.

FIG. 8A shows Modified Example 1 of the support shaft and the holding portion. A support shaft 20A in Modified Example 1 includes a cylindrical base portion 21, a disc-shaped regulating portion 25A having a predetermined thickness, which is continuously provided at one end of the base portion 21, and a tip portion 26 projecting coaxially with the base portion 21 from a tip of the regulating portion 25A. The inner periphery 51 of a holding portion 50A has a shape suitable for an outer peripheral shape of the support shaft 20A, and has a shape to be in close contact with a portion excluding a lower portion of the base portion 21 and continuously surrounds the portion in the circumferential direction. That is, in the support shaft 20A, an outer periphery of the upper portion of the base portion 21, an outer periphery of the regulating portion 25A, and an outer periphery of the tip portion 24 form the sliding contact portion 27 of the support shaft 20.

Figure 8B:
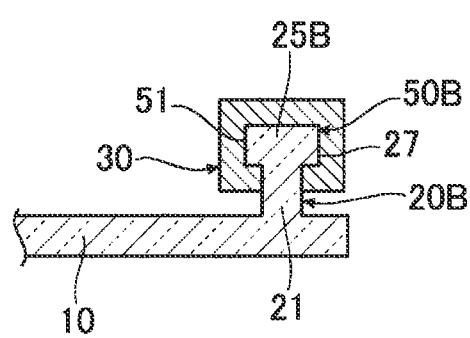

FIG. 8B shows Modified Example 2 of the support shaft and the holding portion. A support shaft 20B in Modified Example 2 includes the cylindrical base portion 21, and a disc-shaped regulating portion 25B having a predetermined thickness, which is continuously provided at one end of the base portion 21. The inner periphery 51 of a holding portion 50B has a shape suitable for an outer peripheral shape of the support shaft 20B, and has a shape to be in close contact with a portion excluding the lower portion of the base portion 21 and continuously surrounds the portion in the circumferential direction. That is, in the support shaft 20B, an outer periphery of the upper portion of the base portion 21 and an outer periphery of the regulating portion 25B form the sliding contact portion 27.

Figure 8C:
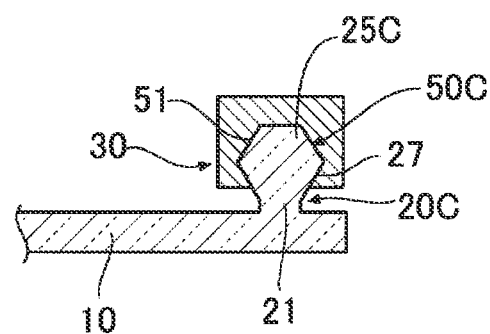

FIG. 8C shows Modified Example 3 of the support shaft and the holding portion. A support shaft 20C in Modified Example 3 includes the cylindrical base portion 21, and a regulating portion 25C having a substantially hexagonal cross section, which is continuously provided at one end of the base portion 21. The inner periphery 51 of a holding portion 50C has a shape suitable for an outer peripheral shape of the support shaft 20C, and has a shape to be in close contact with a portion excluding the lower portion of the base portion 21 and the regulating portion 25C and continuously surrounds the portion in the circumferential direction. That is, in the regulating portion 25C of the support shaft 20C, the portion held by the inner periphery 51 of the holding portion 50C forms the sliding contact portion 27.

Figure 8D:
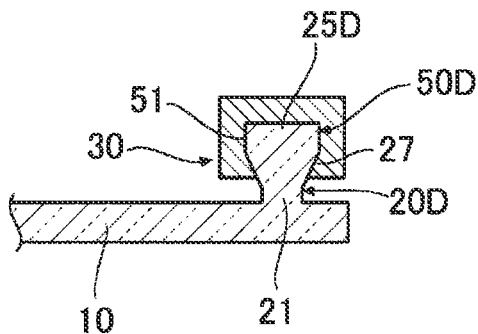

FIG. 8D shows Modified Example 4 of the support shaft and the holding portion. A support shaft 20D in Modified Example 4 includes the cylindrical base portion 21, and a regulating portion 25D having a substantially trapezoidal cross section with a wide upper bottom and a narrow lower bottom, which is continuously provided at one end of the base portion 21. The inner periphery 51 of a holding portion 50D has a shape suitable for an outer peripheral shape of the support shaft 20D, and has a shape to be in close contact with a portion excluding the lower portion of the base portion 21 and the regulating, portion 25D and continuously surrounds the portion in the circumferential direction. That is, in the regulating portion 25D of the support shaft 20D, the portion held by the inner periphery 51 of the holding portion 50D forms the sliding contact portion 27.

Figure 8E:
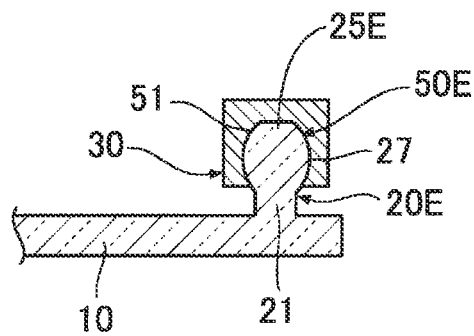

FIG. 8E shows Modified Example 5 of the support shaft and the holding portion. A support shaft 20E in Modified Example 5 includes the cylindrical base portion 21, and a regulating portion 25E continuously provided at one end of the base portion 21, whose outer periphery forms a curved surface in which a central portion in the axial direction bulges and in which upper and lower portions in the axial direction gradually narrow and whose an upper end has a flat surface. The inner periphery 51 of a holding portion 50E has a shape suitable for an outer peripheral shape of the support shaft 20E, and has a shape to be in close contact with a portion excluding the lower portion of the base portion 21 and the regulating portion 25E and continuously surrounds the portion in the circumferential direction. That is, in the regulating portion 25E of the support shaft 20E, the portion held by the inner periphery 51 of the holding portion 50E forms the sliding contact portion 27.

In the embodiment and each modified example, the entire inner periphery of the holding portion can be in close contact with the sliding contact portion of the support shaft, but the inner periphery of the holding portion may be only partially in close contact with the sliding contact portion of the support shaft. However, in this case, a predetermined range of the inner periphery of the holding portion comes into surface contact with the sliding contact portion of the support shaft.

As described above, in the connecting structure, with the rotating support member 10 and the rotating member 30 molded from the resin materials, the inner periphery 51 of the holding portion 50 has a shape to be in close contact with and surround the sliding contact portion 27 of the support shaft 20, and to be continuous in the circumferential direction, the support shaft 20 is suppressed from coming off from the holding portion 50 and held, and the rotating support member 10 and the pair of rotating members 30, 30 are connected in advance and integrated.

In the connecting structure, as shown in FIG. 3, due to a space of a formwork during molding, the pair of rotating members 30, 30 forming the rod are molded in a parallel state. Therefore, when assembling an assembled body in which the rotating support member 10 and the pair of rotating members 30, 30 are integrated to the opening and closing body 3, as shown in FIG. 1, one rotating member 30 is rotated so that the tip portion 33 of the one rotating member 30 is separated from the other rotating member 30. Then, as shown in FIG. 1, by inserting the shaft portion 13 of the rotating support member 10 into the support hole 5a of the support portion 5, the engagement pieces 19, 19 of the rotating support member 10 are locked to the back side peripheral edge of the support hole 5a, so that the rotating support member 10 is rotatably supported with respect to the support portion 5 and held to be suppressed from coming off (see FIG. 2). In this way, by the rotating support member 10 rotating in a predetermined direction, the pair of rotating members 30, 30 slide in synchronization with each other via the rotating support member 10.

By inserting the spring mounting portion 15 of the rotating support member 10 into the winding portion 9a of the urging spring 9, the urging spring 9 is mourned on the rotating support member 10. By locking the other arm portion 9b of the urging spring 9 to one spring locking piece 17 of the rotating support member 10, as shown by an arrow E1 direction in FIG. 12, the rotating support member 10 is rotationally urged, so that the tip portions 33, 33 of the pair of rotating members 30, 30 are urged in a direction (as shown by an arrow E2 direction in FIG. 12) of engaging with the pair of lock portions 1b, 1b.

Figure 13:
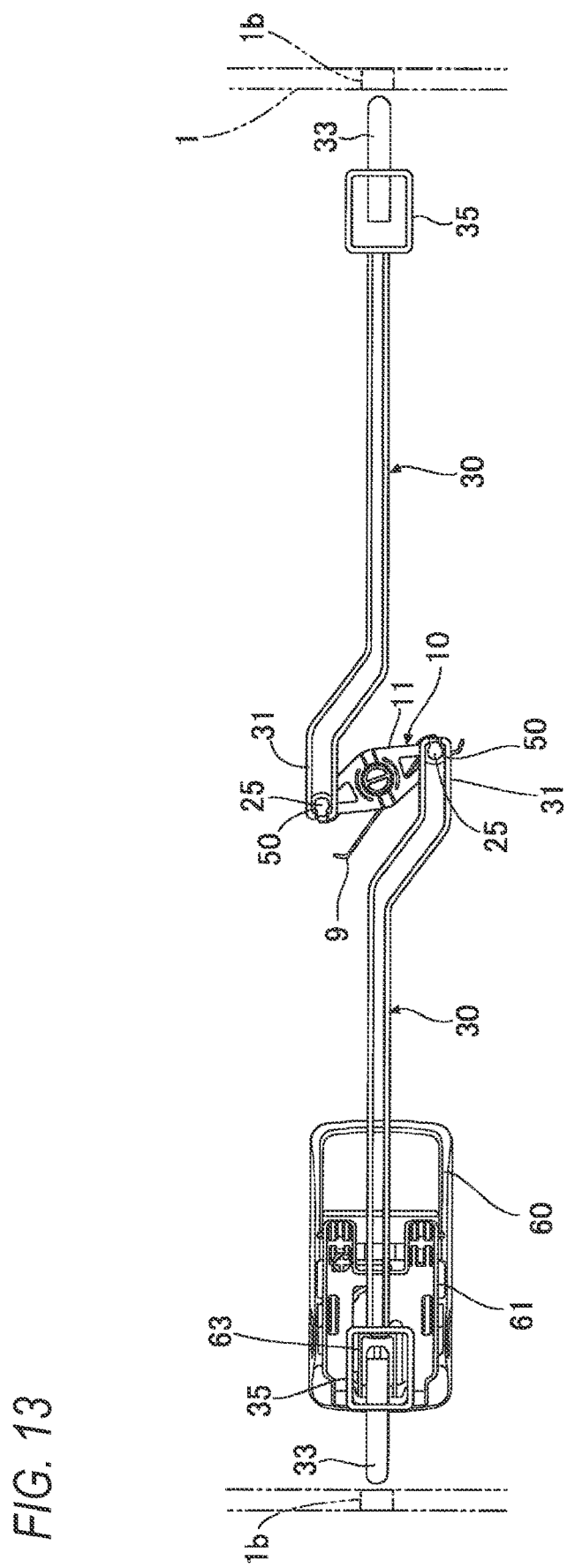
FIG. 13 is a front explanatory diagram showing the case where the opening and closing body is released from the locking state when the connecting structure is applied to the locking device.
Figure 14A:
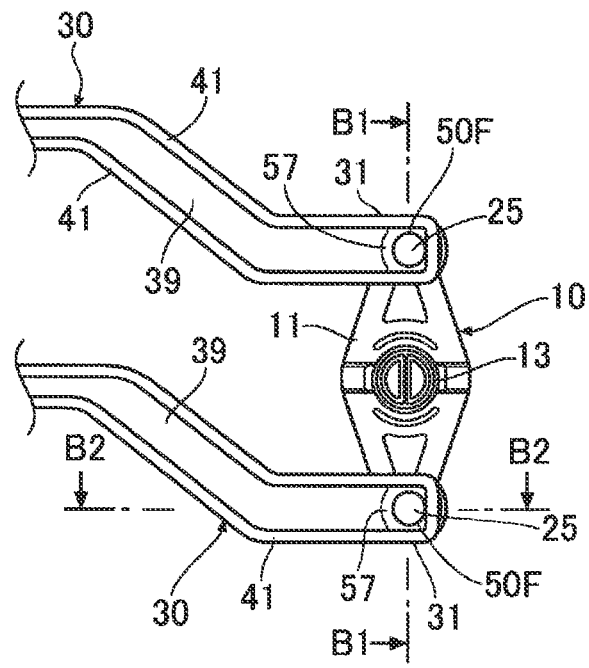
Figure 14B:
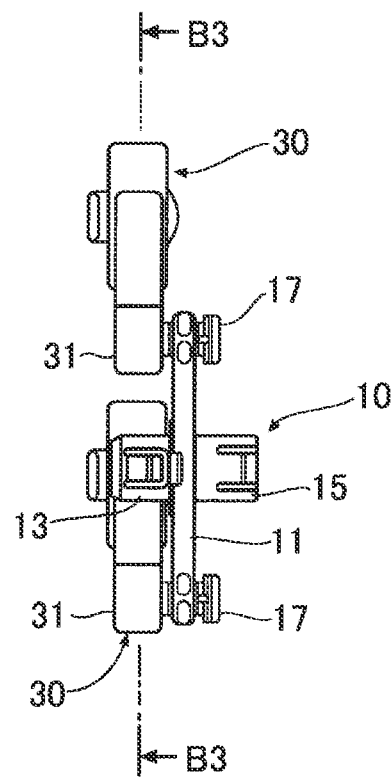
Figure 15A:
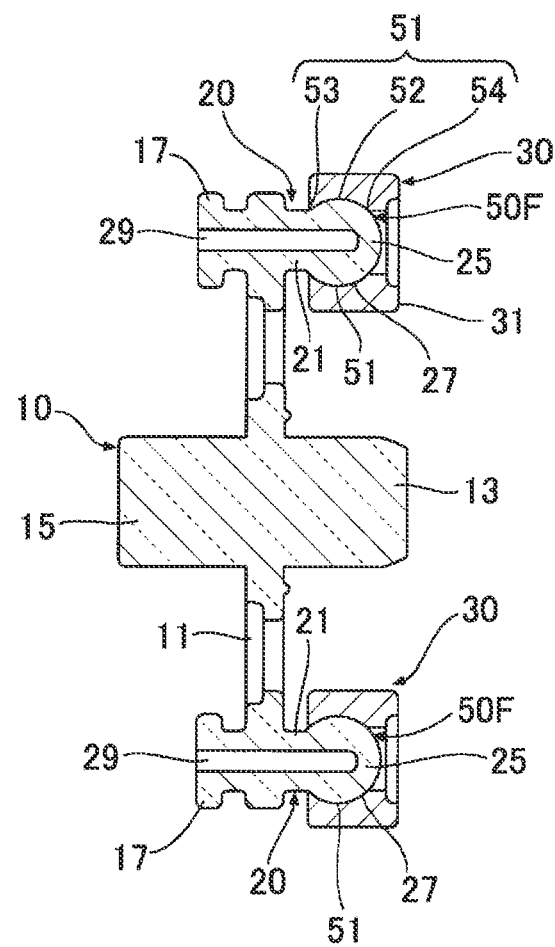
FIG. 15A is a cross-sectional diagram taken along an arrow line B1-B1 in FIG. 14A.
Figure 15B:
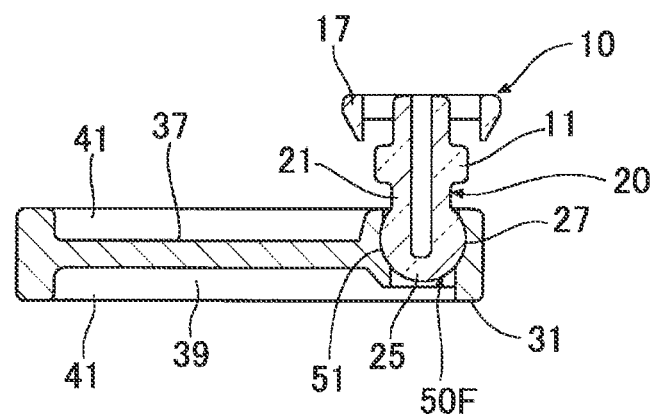
FIG. 15B is a cross-sectional diagram taken along an arrow line B2-B2 in FIG. 14A.

As shown in FIGS. 10 and 12, the lever 63 provided on the operating member 60 is to enter a frame-shaped portion 35 of one rotating member 30. Therefore, as shown in FIG. 11, by rotating one end of the operating member 60 in a direction away from the base member 61, the lever 63 presses an inner surface of the frame-shaped portion 35, and as shown in FIG. 13, the tip portion 33 of one rotating member 30 is pulled in from the lock portion 1b to a non-engaging direction, against an urging force caused by the urging spring 9. In interlocking (synchronous) with the tip portion 33 of the one rotating member 30, the tip portion 33 of the other rotating member 30 can be pulled in from the lock portion 1b to the non-engaging direction via the rotating support member 10. As a result, a locking state of the opening and closing body 3 in which the opening portion 1a of the fixed body 1 is closed can be released.

In the above embodiment, the rotating support member 10 is provided with the support shaft 20, and the rotating member 30 is provided with the holding portion 50, but the holding portion may be provided on the rotating support member side, and the support shaft may be provided on the rotating member side (this will be described later in the embodiment).

The rotating support member described above can be molded from a resin material such as polypropylene (PP), polybutylene terephthalate (PBT), a polyamide resin such as nylon, or polyacetal (POM). The rotating member can be molded from a resin material such as a polyamide resin such as nylon, polyacetal (POM), or polybutylene terephthalate (PBT). The rotating support member and the rotating member are preferably made of different materials. In any case, the rotating support member and the rotating member need to be made of materials that do not join with each other when molded with the resin materials. Each portion (main body, support shaft, regulating portion, sliding contact portion, and the like) that constitutes the rotating support member is integrally formed, and each portion (proximal end portion, tip portion, frame-shaped portion, holding portion, and the like) that constitutes the rotating member is also integrally formed.

Next, a method for manufacturing the connecting structure of a rotating member according to the present invention will be described.

Based on the above-mentioned connection structure of a rotating member, the method for manufacturing the connecting structure of a rotating member (hereinafter, also simply referred to as "manufacturing method") includes a first step of molding one of the rotating support member and the rotating member including the support shaft by injecting a first resin material into a first injection molding mold, and a second step of injecting a second resin material that does not join with the first resin material in a molten state into a second injection molding mold to mold the other of the rotating support member and the rotating member including the holding portion, with a molded product molded in the first step arranged in the second injection molding mold.

The first resin material and the second resin material include polypropylene (PP), polybutylene terephthalate (PBT), polyamide-based resin, polyacetal (POM), and the like, which are mentioned as materials for the rotating support member and the rotating member. However, at least, the second resin material does not join with the first resin material in a molten state.

Figure 9A:
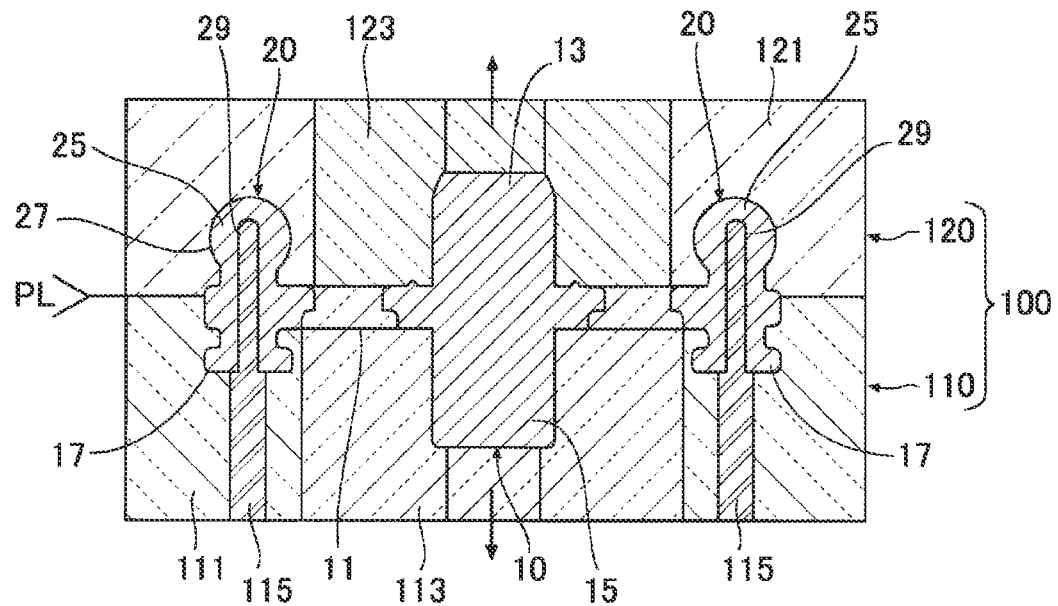
Figure 9B:
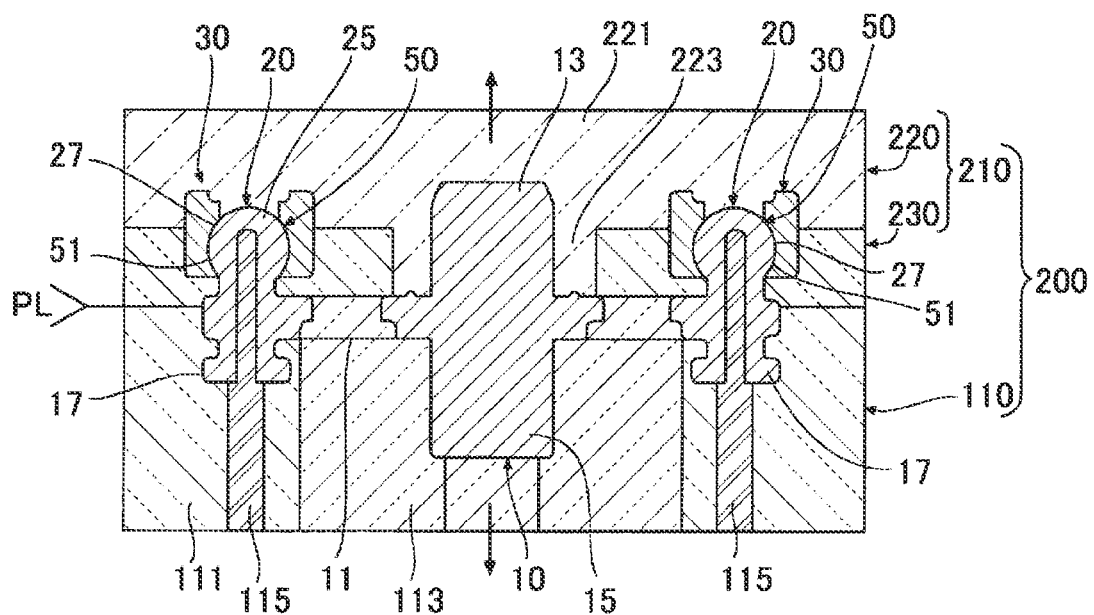

In the manufacturing method in the embodiment, the first injection molding mold 100 shown in FIG. 9A is used in the first step, and the second injection molding mold 200 shown in FIG. 9B is used in the second step. In the embodiment, the rotating support member 10 (first molded product) is molded by the first injection molding mold 100, and the rotating member 30 (second molded product) is molded by the second injection molding mold 200.

The first injection molding mold 100 includes a first mold 110 and a second mold 120 arranged to face the first mold 110. Between the first mold 110 and the second mold 120 is a so-called parting line PL (hereinafter, simply referred to as "PL") at which both molds 110 and 120 come into contact with each other and can be separated from each other.

The first mold 110 includes an outer frame 111 for mainly molding the spring locking piece 17 and the like of the rotating support member 10, an inner frame 113 which is arranged inside the outer frame 111 and for mainly molding the main body 11, the spring mounting portion 15, and the like of the rotating support member 10, and a pin 115 for molding the punching hole 29. The inner frame 113 and the pin 115 are movable in a direction orthogonal to the PL, and the outer frame 111 is movable in a direction from a front side to a back side of a paper surface.

The second mold 120 includes an outer frame 121 for mainly molding the support shaft 20 and the like of the rotating support member 10, and an inner frame 123 which is arranged inside the outer frame 121 and fix mainly molding the shaft portion 13 and the like of the rotating support member 10. The inner frame 123 is movable in the direction orthogonal to the PL, and the outer frame 121 is movable in the direction from the front side to the back side of the paper surface.

The second injection molding mold 200 includes the first mold 110 common to that of the first injection molding mold 100, and a third mold 210 arranged to face the first mold 110. The third mold 210 includes an outer frame 220 including a base portion 221 and a downwardly extending portion 223 downwardly extending from a center of the base portion 221 toward the first mold 110, and inner frames 230 arranged on both sides of the downwardly extending portion 223. The downwardly extending portion 223 of the outer frame 220 is arranged on an outer periphery of the shaft portion 13 and the like of the rotating support member 10. The base portion 221 of the outer frame 220 forms approximately half in the thickness direction, including the holding portion 50 of the rotating member 30. The outer frame 220 is movable in the direction orthogonal to the PL. The inner frame 230 forms the remaining portion in the thickness direction, including the holding portion 50 of the rotating member 30, and is movable in the direction from the front side to the back side of the paper surface.

As shown in FIG. 9A, the first mold 110 and the second mold 120 of the first injection molding mold 100 are closed. In this way, a cavity for molding the first molded product (here, the rotating support member 10) is formed inside. By injecting the first resin material into this cavity, the first molded product is molded (first step). Then, the second mold 120 is opened with respect to the first mold 110, and the outer frame 121 and the inner frame 123 are appropriately moved, so that the first molded product is removed from the second mold 120. As a result, the first molded product remains set in the first mold 110.

Next, as shown in FIG. 9B, with the first molded product set in the first mold 110, the third mold 210 of the second injection molding mold 200 is closed with respect to the first mold 110. In this way, a cavity for molding the second molded product (here, the rotating member 30) is formed inside. By injecting the second resin material into this cavity, the second molded product is molded (second step). In this case, as shown in FIG. 9B, the rotating member 30 is molded so that the inner periphery 51 of the holding portion 50 is in close contact with the sliding contact portion 27 of the support shaft 20 and is continuous in the circumferential direction. Then, the third mold 210 is opened with respect to the first mold 110, and the outer frame 220 and the inner frame 230 are appropriately moved, so that the first molded product and the second molded product are removed from the third mold 210. Then, by appropriately moving the outer frame 111, the inner frame 113, and the pin 115 of the first mold 110, the first molded product and the second molded product are removed from the first mold 110. In this way, an assembly body in which the rotating support member 10 and the pair of rotating members 30, 30 are integrated in advance as shown in FIG. 3 is manufactured.

As mentioned above, in the embodiment, a so-called two-color molding is adopted, in which two molded products (the rotating support member 10 and the rotating member 30) are injection-molded by an injection molding mold that is common in all or part (here, common in the first mold 110).

In the embodiment, after molding the rotating support member 10 including the support shaft 20, the rotating member 30 including the holding portion 50 was molded. However, when the support shaft is formed on the rotating member and the holding portion is formed on the rotating support member, the rotating member including the support shaft is formed, and then the rotating support member including the holding portion is formed.

In the manufacturing method of the embodiment, the two-color molding is adopted as described above, but a well-known insert molding may be adopted. That is, for example, after molding the rotating support member with the first injection molding mold, the rotating support member is set in the second injection molding mold, which has no part in common with the first injection molding mold, and then the rotating member may be molded by the second injection molding mold.

Next, functions and effects of the connecting structure of a rotating member having the above configuration and the method for manufacturing the connecting structure of a rotating member will be described.

That is, in the connecting structure, as shown in FIGS. 6A and 6B, FIG. 7, and FIG. 9B, the inner periphery 51 of the holding portion 50 has a shape in which the portion in close contact with the sliding contact portion 27 is continuously formed in the circumferential direction, so that the rotating support member 10 and the rotating member 30 are formed so as to be connected to each other. Therefore, the support shaft 20 can be rotatably supported by the holding portion 50 with both members 10 and 30 molded, and thus it is possible to eliminate an operation of connecting the rotating member 30 and the rotating support member 10. Since the inner periphery 51 of the holding portion 50 is in close contact with the sliding contact portion 27 of the support shaft 20, it is possible to suppress raffling when the rotating member 30 rotates with respect to the rotating support member 10.

As shown in FIG. 7, in the embodiment, the regulating portion 25 has a circular shape when viewed from the axial direction of the support shaft 20, and the outer periphery of the regulating portion 25 is the sliding contact portion 27 that is in sliding contact with the inner periphery 51 of the holding portion 50, and as shown in FIGS. 6A and 6B, the holding portion 50 is configured to hold the regulating portion 25 on the inner periphery 51 to suppress the support shaft 20 from coming off. That is, the outer periphery of the regulating portion 25 forms the sliding contact portion 27, and the inner periphery 51 of the holding portion 50 receives and holds the regulating portion 25 so as to suppress it from coming off, and thus a height of the support shaft 20 in the axial direction can be shortened to make it compact. The regulating portion 25 also has a circular shape when viewed from the axial direction, and the sliding contact portion 27 on the outer periphery thereof is in close contact with the inner periphery 51 of the holding portion 50, so that a large sliding contact area of the support shaft 20 can be ensured, and it is possible to more reliably suppress rattling when the rotating member 30 is rotated.

Further, in the embodiment, since the regulating portion 25 of the support shaft 20 has a spherical shape, the rotating member 30 can be flexibly rotated in any direction, for example, can be rotated by 360° around the axis of the support shaft 20 as shown by the arrow F1 in FIG. 4, or can be rotated so as to be close to and separated from the rotating support member 10 as shown by the arrow F2 in FIG. 4.

In the embodiment, as shown in FIG. 7, a part of the holding portion 50 is cut off when viewed from the axial direction of the support shaft 20. Therefore, when a member on a side on which the holding portion is formed (here, the rotating member 30) contracts after molding, it is possible to relax tightening of the sliding contact portion 27 of the support shaft 20 by the inner periphery 51 of the holding portion 50. As a result, when the rotating member 30 rotates with respect to the rotating support member 10, a frictional force between the sliding contact portion 27 of the support shaft 20 and the inner periphery 51 of the holding portion 50 can be reduced, and the rotating member 30 can be flexibly rotated while suppressing rattling.

Further, in the embodiment, the rotating support member 10 forms the rotor, and the rotating member 30 forms the rod, which are applied to the locking device for the opening and closing member. That is, when the connecting structure of a rotating member is applied to the locking device, it is possible to suppress the rod from rattling with respect to the rotor.

In the locking device to which the connecting structure of the present invention is applied, when the opening and closing body 3 is closed from a state in which the opening and closing body 3 is opened from the opening portion 1a of the fixed body 1, the tip portions 33, 33 of the pair of rotating members 30, 30 are engaged with the lock portions 1b, 1b of the fixed body 1, and thus the opening and closing body 3 is locked in the closed state as shown in FIGS. 10 and 12. As shown in FIG. 11, when one end of the operating member 60 is rotated in a direction away from the base member 61 from this state, as shown in FIG. 13, the tip portions 33, 33 of the pair of rotating members 30, 30 are pulled in from the lock portions 1b, 1b to the non-engaging direction against the rotational urging force of the rotating support member 10. Therefore, the locking state of the opening and closing body 3 is released, and the opening and closing body 3 can be opened from the opening portion 1a of the fixed body 1.

As described above, the method for manufacturing the connecting structure of a rotating member includes the first step of molding one of the rotating support member and the rotating member (here, the rotating support member 10) including the support shaft 20 by injecting the first resin material into the first injection molding mold 100, and the second step of injecting the second resin material that does not join with the first resin material in a molten state into the second injection molding mold 200 to mold the other of the rotating support member and the rotating member (here, the rotating member 30) including the holding portion 50, with a molded product molded in the first step arranged in the second injection molding mold 200.

Therefore, the rotating member 30 can be molded by the first step and the second step such that as shown in FIG. 9B, the inner periphery 51 of the holding portion 50 includes a portion in close contact with the sliding contact portion 27 of the support shaft 20, and the portion has a shape that continuously surrounds the sliding contact portion 27 in the circumferential direction. Therefore, the support shaft 20 can be rotatably supported by the holding portion 50 with both members 10 and 30 molded, and thus it is possible to eliminate the operation of connecting the rotating member 30 and the rotating support member 10. Further, since the inner periphery 51 of the holding portion 50 is in close contact with the sliding contact portion 27 of the support shaft 20, it is possible to suppress rattling when the rotating member 30 rotates with respect to the rotating support member 10.

FIGS. 14A to 16 show a second embodiment of the connecting structure of a rotating member according to the present invention. Substantially the same parts as those of the above embodiment are designated by the same reference numerals, and description thereof will be omitted.

Figure 16:
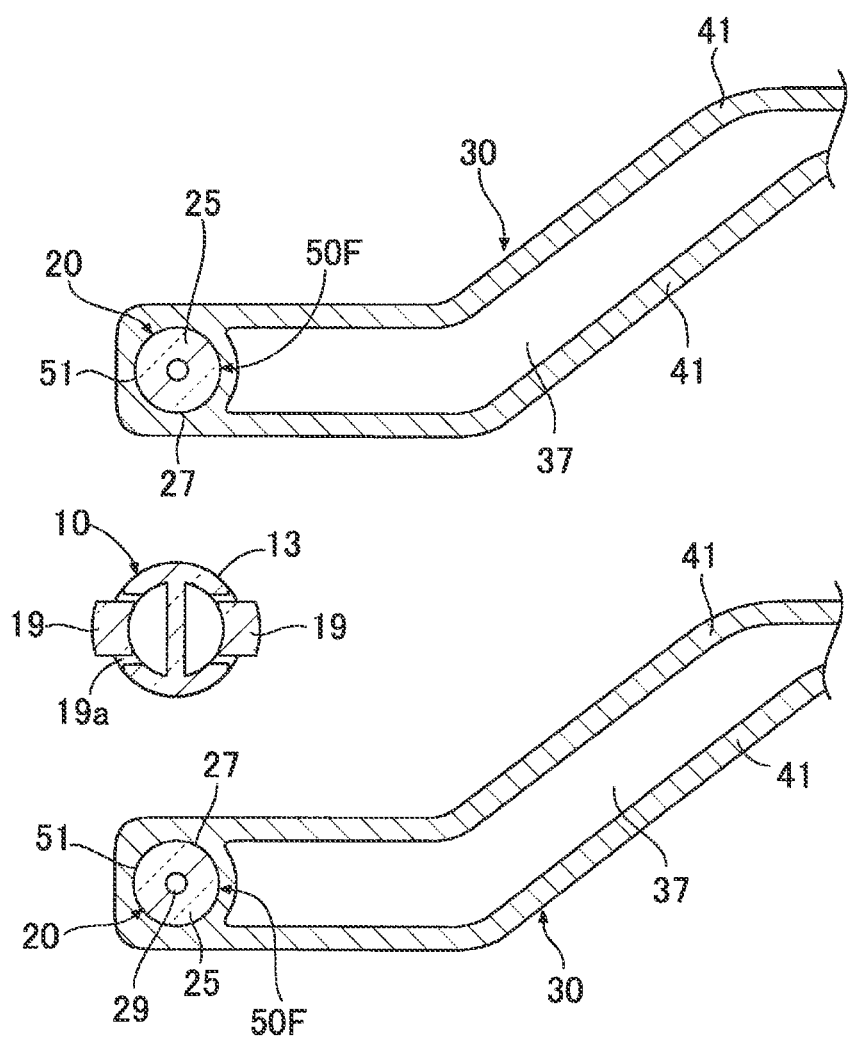
FIG. 16 is a cross-sectional diagram taken along an arrow line B3-B3 in FIG. 14B.

The shape of the rotating member of the connecting structure of a rotating member of the embodiment is different from that of the above embodiment. That is, as shown in FIG. 16, the inner periphery 51 of the holding portion 50F constituting the rotating member 30 in the embodiment is formed so as to surround the entire periphery of the sliding contact portion 27 of the support shaft 20 when viewed from the axial direction of the support shaft 20 (continuously formed in the circumferential direction so as to surround the entire periphery of the sliding contact portion 27 of the support shaft 20). The inner periphery 51 of the holding portion 50F in the rotating member 30 is not configured to be separated via the slit 55 as in the above embodiment.

Then, in the embodiment, since the inner periphery 51 of a holding portion 50F is formed so as to surround the entire periphery of the sliding contact portion 27 of the support shaft 20 when viewed from the axial direction of the support shaft 20, when a member on a side on which the holding portion 50F is formed (here, the rotating member 30) contracts after molding, the inner periphery 51 of the holding portion 50F presses against the sliding contact portion 27 of the support shaft 20 so as to fasten it. As a result, when the rotating member 30 rotates with respect to the rotating support member 10, the frictional force between the sliding contact portion 27 of the support shaft 20 and the inner periphery 51 of the holding portion 50F can be increased to improve a rotational torque of the rotating member 30, and the rotating member 30 can be used as a braking member. An aspect in which the rotating member 30 is used as a braking member is also described in the following fifth embodiment.

Figure 17A:
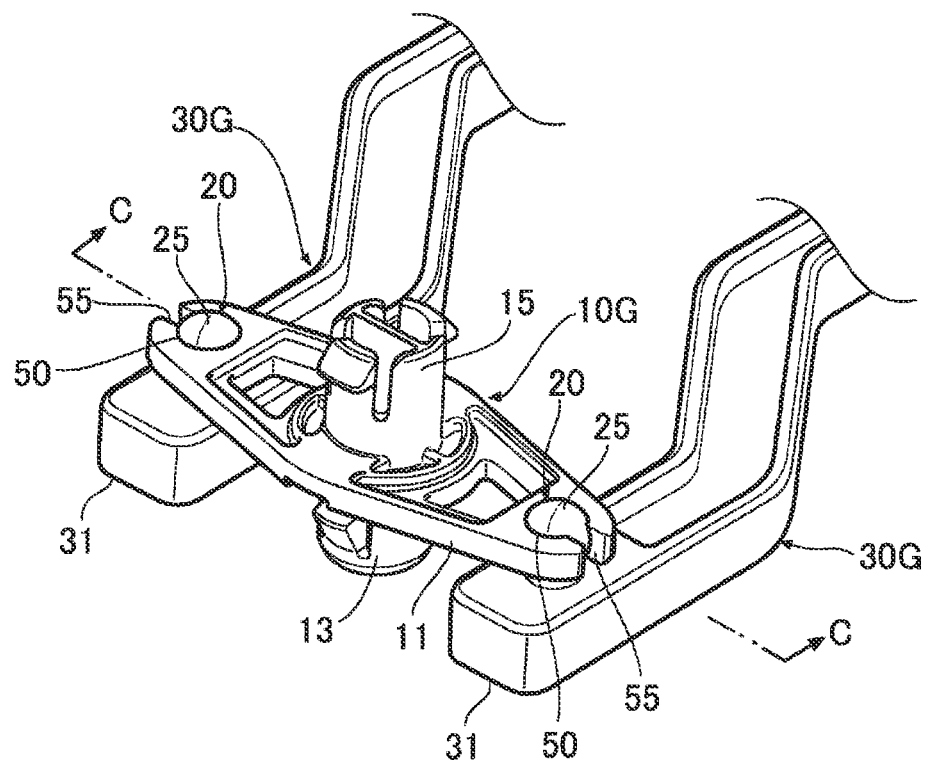
Figure 17B:
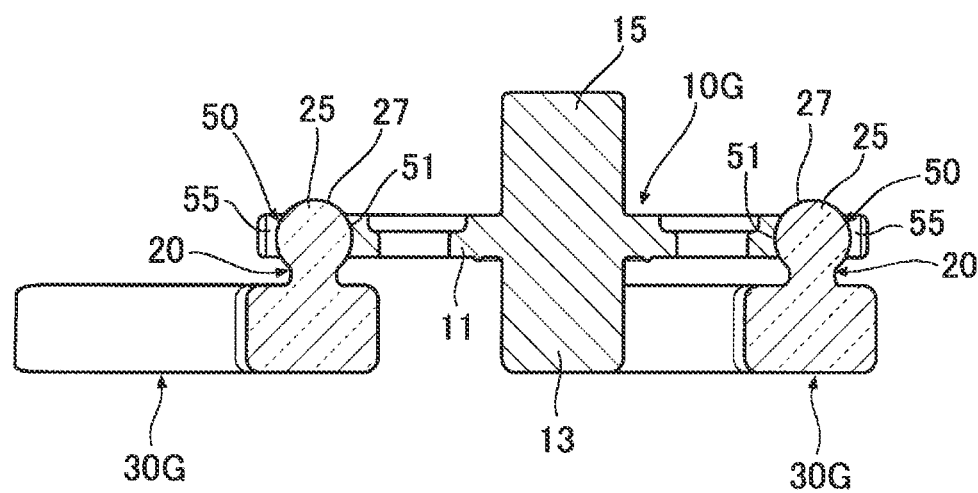

FIGS. 17A and 17B show a third embodiment of the connecting structure of a rotating member according to the present invention. Substantially the same parts as those of the above embodiment are designated by the same reference numerals, and description thereof will be omitted.

In the connecting structure of a rotating member in the embodiment, the holding portion 50 is provided on a rotating support member 10G, and the support shaft 20 is provided on a rotating member 30G.

Specifically, the holding portions 50 are formed at both ends in the longitudinal direction of the main body 11, which has a substantially rhombus shape, of the rotating support member 10G. A part of the inner periphery 51 of the holding portion 50 in the circumferential direction (an outermost peripheral portions of both ends in the longitudinal direction of the main body 11) is cut off via the slit 55. The support shaft 20 provided with the spherically bulging regulating portion 25 is projected from the front surface 37 side of the proximal end portion 31 of the rotating member 30G. Similar to the embodiments described above, the inner periphery 51 of the holding portion 50 the inner periphery 51 of the holding portion 50 has a shape in which a portion in close contact with the sliding contact portion 27 is continuously formed in the circumferential direction and surrounds the sliding contact portion 27, so that the rotating support member 10G and the rotating member 30G are molded so as to be connected to each other.

Figure 18A:
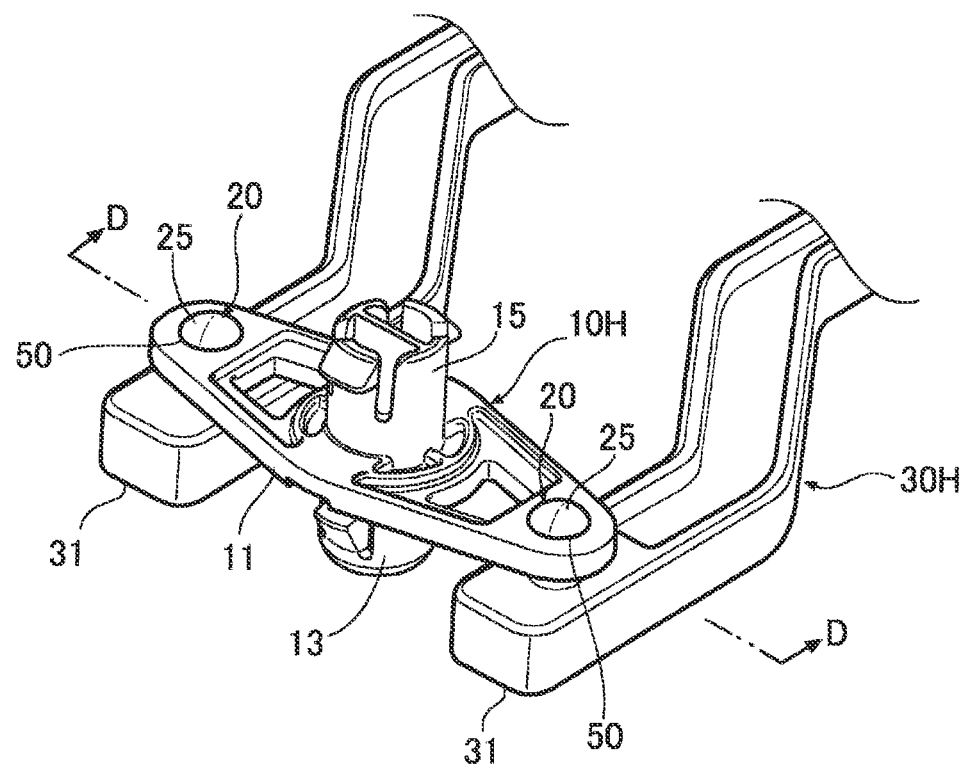
Figure 18B:
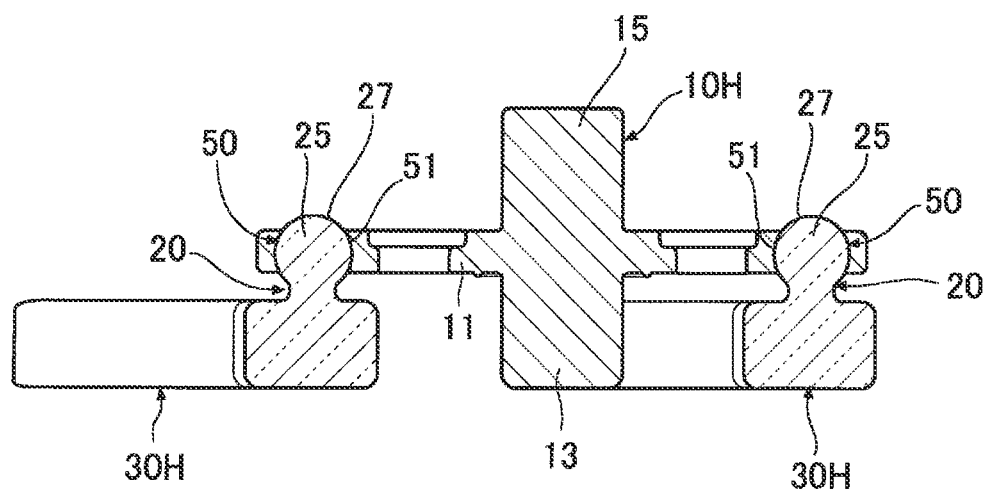

FIGS. 18A and 18B show a fourth embodiment of the connecting structure of a rotating member according to the present invention. Substantially the same parts as those of the above embodiment are designated by the same reference numerals, and description thereof will be omitted.

Similar to the third embodiment, in the connecting structure of a rotating member in the embodiment, the holding portion 50 is provided on a rotating support member 10H, and the support shaft 20 is provided on a rotating member 30H. However, the inner periphery 51 of the holding portion 50 is formed so as to surround the entire periphery of the sliding contact portion 27 of the support shaft 20 when viewed from the axial direction of the support shaft 20. Similar to the embodiments described above, the inner periphery 51 of the holding portion 50 has a shape in which a portion in close contact with the sliding contact portion 27 is continuously formed in the circumferential direction and surrounds the sliding contact portion 27, so that the rotating support member 10H and the rotating member 30H are molded so as to be connected to each other.

Figure 19A:
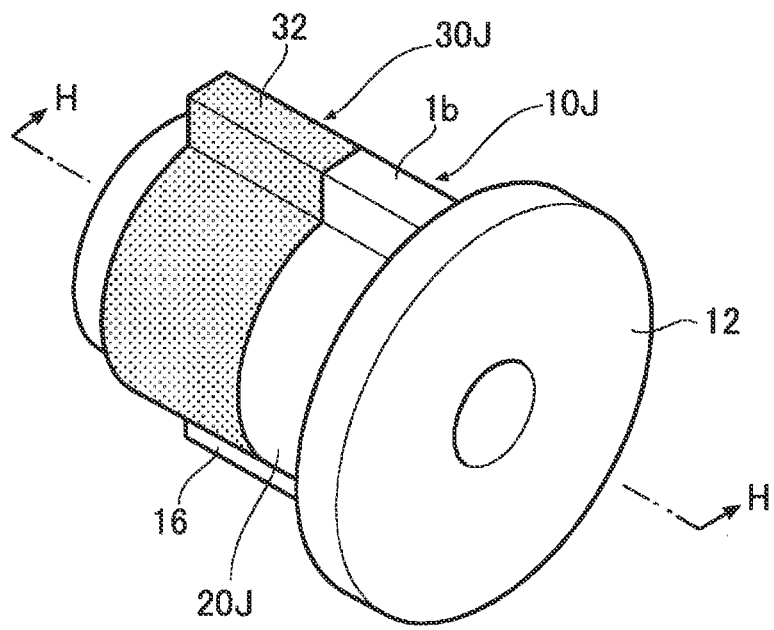
Figure 19B:
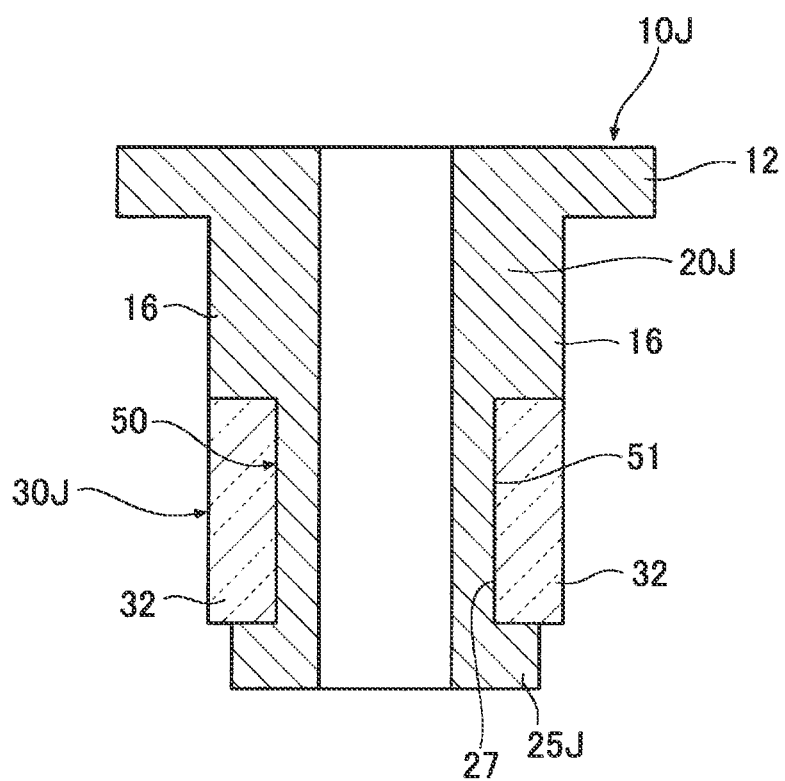

FIGS. 19A and 19B show a fifth embodiment of the connecting structure of a rotating member according to the present invention. Substantially the same parts as those of the above embodiment are designated by the same reference numerals, and description thereof will be omitted.

The connecting structure of a rotating member of the embodiment has an application place different from those of the first to fourth embodiments. That is, the connecting structure of the embodiment can be used as, for example, a braking member (for free stop) of a console lid arranged between a driving seat and a passenger seat of a vehicle.

As shown in FIGS. 19A and 19B, a rotating support member 10J of the embodiment includes a disk-shaped flange portion 12 and a cylindrical support shaft 201 protruding from a center of a back side of the flange portion 12 by a predetermined length. As shown in FIG. 19B, the support shaft 20J has an enlarged diameter at a proximal end portion thereof, a reduced diameter at a tip portion side thereof, and is provided with a regulating portion 25J having an annulus protrusion shape at a front-most end thereof. On an outer periphery of the support shaft 20J, a portion between the proximal end portion having the enlarged diameter and the regulating portion 25J forms the sliding contact portion 27. A pair of protruding engaging protrusions 16, 16 are provided on the outer periphery of the proximal end portion of the support shaft 20J so as to engage with a member that opens and closes and supports a console lid (not shown).

The rotating member 30J has a substantially cylindrical shape, and a pair of protruding engaging protrusions 32, 32 are projected from an outer periphery thereof. The engaging protrusions 32, 32 are to engage with a console lid (not shown). The support shaft 20J is held in the holding portion 50 of the rotating member 30J, and the regulating portion 25J is arranged on a front side peripheral edge of the holding portion 50, so that the support shaft 20J is held and suppressed from coming off. The inner periphery 51 of the holding portion 50 has a shape in which a portion in close contact with the sliding contact portion 27 is continuously formed in the circumferential direction and surrounds the sliding contact portion 27, so that the rotating support member 10J and the rotating member 30J are molded so as to be connected to each other.

In the embodiment, the inner periphery 51 of the holding portion 50 is formed so as to surround the entire periphery of the sliding contact portion 27 of the support shaft 20J when viewed from an axial direction of the support shaft 20J, so that a frictional force between the sliding contact portion 27 of the support shaft 20J and the inner periphery 51 of the holding portion 50 can be increased to improve a rotational torque of the rotating member 30J. As a result, it can be used as a braking member for a relatively heavy console lid as described above.

The present invention is not limited to the embodiments described above, and various modifications can be made within the scope of the gist of the present invention, and such embodiments are also included in the scope of the present invention.

REFERENCE SIGNS LIST 10, 10G, 10H: rotating support member
20, 20A, 20B, 20C, 20D, 20E, 20J: support shaft
25, 25A, 25B, 25C, 25D, 25E, 25J: regulating portion
27: sliding contact portion
30, 30F, 30G, 30H, 30J: rotating member
50, 50F: holding portion
51: inner periphery
60: operating member
61: base member
63: lever
100: injection molding mold

The invention claimed is:

1. A connecting structure of a rotating member, wherein
the rotating member molded from a resin material is configured to be rotatably connected to a rotating support member molded from a resin material,
one of the rotating support member and the rotating member includes a main body and a support shaft provided on the main body,
an other of the rotating support member and the rotating member includes a holding portion that is configured to receive and hold the support shaft,
the support shaft includes a base portion protruding from the main body, a regulating portion that is configured to regulate axial movement of the support shaft with respect to the holding portion and that is continuously provided at a tip of the base portion in a protrusion direction, and a sliding contact portion that has a circular shape when viewed from an axial direction of the support shaft and that is configured to be in sliding contact with an inner periphery of the holding portion,
the rotating support member and the rotating member are made of materials that do not join each other when molded from the resin materials,
the inner periphery of the holding portion has a shape in which a portion in close contact with the sliding contact portion is continuously formed in a circumferential direction, so that the rotating support member and the rotating member are molded in a state of being connected to each other,
a part of the holding portion is cut off via a slit when viewed from the axial direction of the support shaft,
the holding portion has a configuration in which a front surface side and a back surface side are open and lateral sides thereof communicate with the slit,
the inner periphery of the holding portion has a shape in which a central portion thereof has the largest diameter, and
a width of the base portion is larger than a width of the slit.

2. The connecting structure of the rotating member according to claim 1, wherein
the regulating portion has a circular shape when viewed from the axial direction of the support shaft, and an outer periphery of the regulating portion forms the sliding contact portion, and the holding portion is configured to hold the regulating portion on the inner periphery thereof to suppress the support shaft from coming off.

3. The connecting structure of the rotating member according to claim 2, wherein
the regulating portion has a spherical shape.

4. The connecting structure of the rotating member according to claim 1, wherein
the inner periphery of the holding portion is formed so as to surround an entire periphery of the sliding contact portion when viewed from the axial direction of the support shaft.

5. The connecting structure of the rotating member according to claim 1, wherein
the rotating support member forms a rotor, and the rotating member forms a rod, and
the connecting structure of the rotating member is configured to be applied to a locking device for an opening and closing member.

6. A method for manufacturing the connecting structure of the rotating member according to claim 1, comprising:
a first step of molding one of the rotating support member and the rotating member including the support shaft by injecting a first resin material into a first injection molding mold; and
a second step of injecting a second resin material that does not join with the first resin material in a molten state into a second injection molding mold to mold the other of the rotating support member and the rotating member including the holding portion, with a molded product molded in the first step arranged in the second injection molding mold.

7. The connecting structure of the rotating member according to claim 1, wherein
the inner periphery of the holding portion has a shape which gradually narrows toward a front side peripheral edge portion and a back side peripheral edge portion thereof.

8. The connecting structure of the rotating member according to claim 1, wherein
the regulating portion has a spherical shape, and an outer periphery of the regulating portion is the sliding contact portion, and
the inner periphery of the holding portion has a curved surface shape recessed so as to fit to the sliding contact portion of the regulating portion.

* * * * *